(12) United States Patent
Aloe et al.

(10) Patent No.: US 10,899,285 B2
(45) Date of Patent: Jan. 26, 2021

(54) ROTATIONALLY LIMITED CONNECTION SYSTEM

(71) Applicant: CaseXCase, LLC, San Diego, CA (US)

(72) Inventors: J. Ty Aloe, San Diego, CA (US); Mario Minneci, San Diego, CA (US)

(73) Assignee: CASEXCASE, LLC, San Diego, CA (US)

( * ) Notice: Subject to any disclaimer, the term of this patent is extended or adjusted under 35 U.S.C. 154(b) by 0 days.

(21) Appl. No.: 16/161,692

(22) Filed: Oct. 16, 2018

(65) Prior Publication Data

US 2019/0111855 A1    Apr. 18, 2019

Related U.S. Application Data

(60) Provisional application No. 62/572,893, filed on Oct. 16, 2017.

(51) Int. Cl.
| | | |
|---|---|---|
| *B60R 11/02* | (2006.01) | |
| *F16M 11/04* | (2006.01) | |
| *F16M 11/10* | (2006.01) | |
| *F16M 11/12* | (2006.01) | |
| *H04M 1/04* | (2006.01) | |
| *B60R 11/00* | (2006.01) | |
| *H04M 1/12* | (2006.01) | |

(52) U.S. Cl.
CPC .......... *B60R 11/0241* (2013.01); *B60R 11/02* (2013.01); *F16M 11/041* (2013.01); *F16M 11/105* (2013.01); *F16M 11/125* (2013.01); *H04M 1/04* (2013.01); *B60R 2011/007* (2013.01); *B60R 2011/0008* (2013.01); *B60R 2011/0057* (2013.01); *B60R 2011/0071* (2013.01); *B60R 2011/0085* (2013.01); *H04M 1/12* (2013.01)

(58) Field of Classification Search
USPC ...................................... 248/206.5
See application file for complete search history.

(56) References Cited

U.S. PATENT DOCUMENTS

| | | |
|---|---|---|
| 7,191,924 B2 | 3/2007 | Kilmer |
| D552,516 S | 10/2007 | Files |
| | (Continued) | |

FOREIGN PATENT DOCUMENTS

| | | |
|---|---|---|
| CN | 204846250 | 12/2015 |
| CN | 205336356 | 6/2016 |
| | (Continued) | |

OTHER PUBLICATIONS

International Search Report and Written Opinion issued in PCT/US18/56069, dated Dec. 14, 2018, 10 pages.

*Primary Examiner* — Kimberly T Wood
(74) *Attorney, Agent, or Firm* — Procopio Cory Hargreaves and Savitch LLP; Pattric J. Rawlins

(57) ABSTRACT

A rotationally limited connection system that includes a first mount to hold an object or couple with an object, a first ferromagnetic coupling element that includes a material attracted to a magnet or wherein the material includes the magnet, an a first mechanical coupling element. The first mechanical coupling element includes at least one protrusion to limit rotation of the first mount with respect to another object in 90 degrees increments. The first mount is coupled with the first ferromagnetic coupling element and the first mechanical coupling element.

7 Claims, 19 Drawing Sheets

(56) References Cited

U.S. PATENT DOCUMENTS

| | | | |
|---|---|---|---|
| 7,702,297 B2 | 4/2010 | Wu | |
| 7,898,821 B2 | 3/2011 | Pekkarinen et al. | |
| 7,906,936 B2 | 3/2011 | Azancot et al. | |
| D652,779 S | 1/2012 | Richter | |
| D685,687 S | 7/2013 | Richter | |
| 8,511,629 B2 | 8/2013 | Sullivan | |
| 8,616,508 B1 | 12/2013 | Coleman | |
| 9,131,132 B2 | 9/2015 | Graether | |
| 9,182,069 B2 | 11/2015 | Haarburger | |
| 9,357,944 B2 | 6/2016 | Lyden et al. | |
| 9,397,719 B1* | 7/2016 | Schmidt | F16M 11/24 |
| 9,402,016 B1 | 7/2016 | Hidalgo | |
| D765,549 S | 9/2016 | Khodapanah et al. | |
| D772,219 S | 11/2016 | Daniels et al. | |
| D772,220 S | 11/2016 | Daniels et al. | |
| D772,970 S | 11/2016 | Balmer | |
| 9,538,675 B2 | 1/2017 | Le Gette et al. | |
| 9,592,871 B2* | 3/2017 | Whitten | F16B 1/00 |
| 9,616,822 B1* | 4/2017 | Hamilton | B60R 11/0241 |
| D795,327 S | 8/2017 | Martin et al. | |
| 9,729,185 B2 | 8/2017 | Scully et al. | |
| 9,850,926 B2* | 12/2017 | Buchanan | F16B 2/22 |
| 9,963,183 B2 | 5/2018 | Karl | |
| D832,859 S | 11/2018 | Charlesworth et al. | |
| D838,214 S | 1/2019 | Jang | |
| D838,266 S | 1/2019 | Ho | |
| D838,267 S | 1/2019 | Zhang | |
| 10,179,548 B2* | 1/2019 | Fiedler | F16B 9/054 |
| 2002/0113185 A1 | 8/2002 | Ziegler | |
| 2005/0045681 A1 | 3/2005 | Hancock et al. | |
| 2008/0179478 A1 | 7/2008 | Lee | |
| 2010/0289288 A1* | 11/2010 | Smith | B60R 13/0206 296/35.1 |
| 2011/0024470 A1* | 2/2011 | Hajarian | B60R 11/0241 224/276 |
| 2011/0084081 A1* | 4/2011 | Chung | A45C 11/00 220/628 |
| 2012/0199621 A1* | 8/2012 | Yoon | B60R 11/02 224/483 |
| 2013/0146726 A1 | 6/2013 | Bobrow et al. | |
| 2013/0170110 A1 | 7/2013 | Lee | |
| 2013/0221189 A1* | 8/2013 | Kubin | F16M 13/04 248/683 |
| 2013/0303000 A1* | 11/2013 | Witter | H01R 13/6205 439/39 |
| 2014/0144606 A1 | 5/2014 | Jiang | |
| 2014/0165366 A1 | 6/2014 | Hochman | |
| 2014/0265765 A1* | 9/2014 | Khodapanah | F16M 11/14 312/223.1 |
| 2014/0355200 A1* | 12/2014 | Thiers | F16M 11/041 361/679.41 |
| 2015/0034796 A1 | 2/2015 | Jones | |
| 2015/0210334 A1 | 7/2015 | Armstrong et al. | |
| 2016/0028430 A1 | 1/2016 | Crawford et al. | |
| 2016/0039485 A1 | 2/2016 | Esquibel et al. | |
| 2016/0192752 A1 | 7/2016 | Lach et al. | |
| 2016/0259374 A1 | 9/2016 | Breiwa et al. | |
| 2016/0347257 A1* | 12/2016 | Buchanan | B60R 11/02 |
| 2016/0373152 A1* | 12/2016 | Schmidt | H04B 1/3877 |
| 2017/0183052 A1 | 6/2017 | Whitten et al. | |

FOREIGN PATENT DOCUMENTS

| | | | | |
|---|---|---|---|---|
| DE | 202014003960 U1 * | 8/2015 | | B60K 37/04 |
| DE | 102014223592 A1 * | 5/2016 | | B60R 11/02 |
| DE | 102017104068 A1 * | 8/2018 | | F16M 11/041 |
| WO | WO2013034767 | 3/2013 | | |
| WO | WO-2014198982 A1 * | 12/2014 | | B60R 11/02 |

\* cited by examiner

ROTATIONALLY LIMITED CONNECTION SYSTEM

This patent application claims the benefit of U.S. Provisional Patent Application Ser. No. 62/572,893 filed 16 Oct. 2017, the specification of which is hereby incorporated herein by reference.

BACKGROUND OF THE INVENTION

Field of the Invention

One or more embodiments of the invention are related to the field of connection systems, such as a connection system used as part of a portable device. More particularly, but not by way of limitation, one or more embodiments of the invention is related to a rotationally limited connection system used to connect a first component to a second component.

Description of the Related Art

Mounts and cases for items such as mobile phones are known in the art. For example, car mounts for mobile phones exist that allow drivers to use their phones hands-free. Existing solutions for cases and mounts are generally limited in their flexibility. For example, they may not allow users to mount their phones in different orientations. They also generally provide a single solution for a particular use case, such as a car, rather than providing a general-purpose mounting solution that allows attachment of a phone or similar object to any other object such as a car, bicycle, wall, or armband. Finally, existing solutions often do not provide a highly robust connection with multiple coupling elements that resist motion in many directions; in particular, simple mounts often fail when subjected to shear forces such as shocks to the edge of a phone case. In particular, there are no known mounts that enable rotation in predefined rotational increments, and that keep the mount from becoming dislodged through coupling via physical indentations, magnets, and clamps.

For at least the limitations described above there is a need for a rotationally limited connection system.

BRIEF SUMMARY OF THE INVENTION

One or more embodiments described in the specification are related to a rotationally limited connection system. One or more embodiments of the system may connect one component to another component in a manner that limits rotation or other motion when the components are connected, and that allows components to be connected in different rotational orientations. The first component may be for example a case that holds a mobile phone, with connection features on the back of the case. The second component may be for example a receiver that couples to the phone case, and that in turn attaches to another item such as a bicycle handlebar, Go-Pro® system, or other item. Coupling may be achieved via one or more coupling mechanisms such as matching protrusions and indentations, magnetic attraction between elements, and clamps or hooks that attach to corresponding holders. Coupling elements may be configured to hold the components against each other, and to resist rotation and shear forces. Protrusions and corresponding indentations may be for example X-shaped, which allows the phone mount (or similar mount) to be de-coupled and re-coupled in 90-degree increments to be attached to the corresponding receiver in different orientations.

One or more embodiments may include a first mount that is configured to hold or couple to an object, such as for example a mobile phone. One or more embodiments may also include a second mount that is configured to hold or couple to another object, such as for example a bicycle handlebar or an action camera system such as a Go-Pro® system. The first mount and the second mount may have compatible elements that enable them to be connected together. In one or more embodiments, the first mount and second mount may be connected in different rotational orientations. In various embodiments, the scope of the invention may include either or both of the first mount and the second mount.

The first mount may for example be configured to hold or couple to a phone, a camera, a battery, a speaker, an electrical component that uses or stores electricity, an optical component, a connection component, and a container. The second mount may for example be configured to couple with a moveable object, such as a bicycle or vehicle.

The first mount may have a ferromagnetic coupling element, with a magnet or a material attracted to a magnet. It may also have a mechanical coupling element, with one or more protrusions or indentations, that is configured to mechanically couple with a corresponding compatible mechanical coupling element on another component, e.g., a second mount. The mechanical coupling element may be configured to permit de-coupling and re-coupling of the first mount with respect to the other component (e.g., a second mount) in 90-degree increments and thereby limit rotation.

In one or more embodiments, all or part of the ferromagnetic coupling element may be contained in the mechanical coupling element or may be located near the mechanical coupling element.

In one or more embodiments, the second mount may have a ferromagnetic coupling element and a mechanical coupling element configured to couple with the corresponding ferromagnetic coupling element and mechanical coupling element of the first mount. The ferromagnetic coupling element of the second mount may have a magnet or a material that is attracted to a magnet. The mechanical coupling element of the second mount may be configured to permit de-coupling and re-coupling of the first mount with respect to the second mount in 90-degree increments and thereby limit rotation.

In one or more embodiments, the first and second mounts may have additional mechanical coupling elements. The first mount may for example have an element or elements that are configured to rotate towards or away from the first mount, and to attach to the corresponding mechanical coupling element or elements on the second mount.

In one or more embodiments, the additional mechanical coupling element or elements of the first mount may have a narrow portion proximal to the first mount and a wide portion that is distal to said first mount. The additional mechanical coupling element or elements may couple with the corresponding element or elements of the second mount at the distal portion.

In one or more embodiments, the first mount may also include a bumper. The bumper may have any combination of a force absorbing material, a storage compartment, a flotation device, and a light source. The storage compartment may be configured to hold for example a pen, a stylus, an e-cigarette, or medicine. In one or more embodiments, the bumper may also have controls to control one or more of volume, track, thumbs up, thumbs down, display brightness, power on, power off.

In one or more embodiments, the first mount may be constructed so as not to have a mounting rail. This is a problem for known devices that are difficult to align with a rail to couple two portions together for example.

In one or more embodiments, the first mount may have a coil configured to inductively receive or transmit electrical power. The first mount may store electricity and may receive power from an external source, or transmit power external to the first mount. In one or more embodiments, the object contained in or attached to the first mount may have a coil configured to inductively receive or transmit electrical power. The object may store electricity and may receive power from an external source, or transmit power external to the object. In one or more embodiments the second mount may have a second coil that is configured to inductively supply electrical power, for example to the first mount or the object in the first mount. In one or more embodiments the first mount may have a galvanic charging port.

In one or more embodiments, the first mount may have plural mechanical coupling elements configured to daisy chain plural mounts. For example, a daisy-chain configuration may have a series connection that connects the first mount, the second mount, and a third mount; the first mount may be coupled to the second mount and to the third mount. The third mount may for example be configured to hold one or more of a phone, a second camera, a second battery, and a second speaker.

BRIEF DESCRIPTION OF THE DRAWINGS

The above and other aspects, features and advantages of the invention will be more apparent from the following more particular description thereof, presented in conjunction with the following drawings wherein:

FIG. 1 shows a perspective view of the back of the phone case with a mechanical coupling element extended.

DETAILED DESCRIPTION OF THE INVENTION

Figure 1:
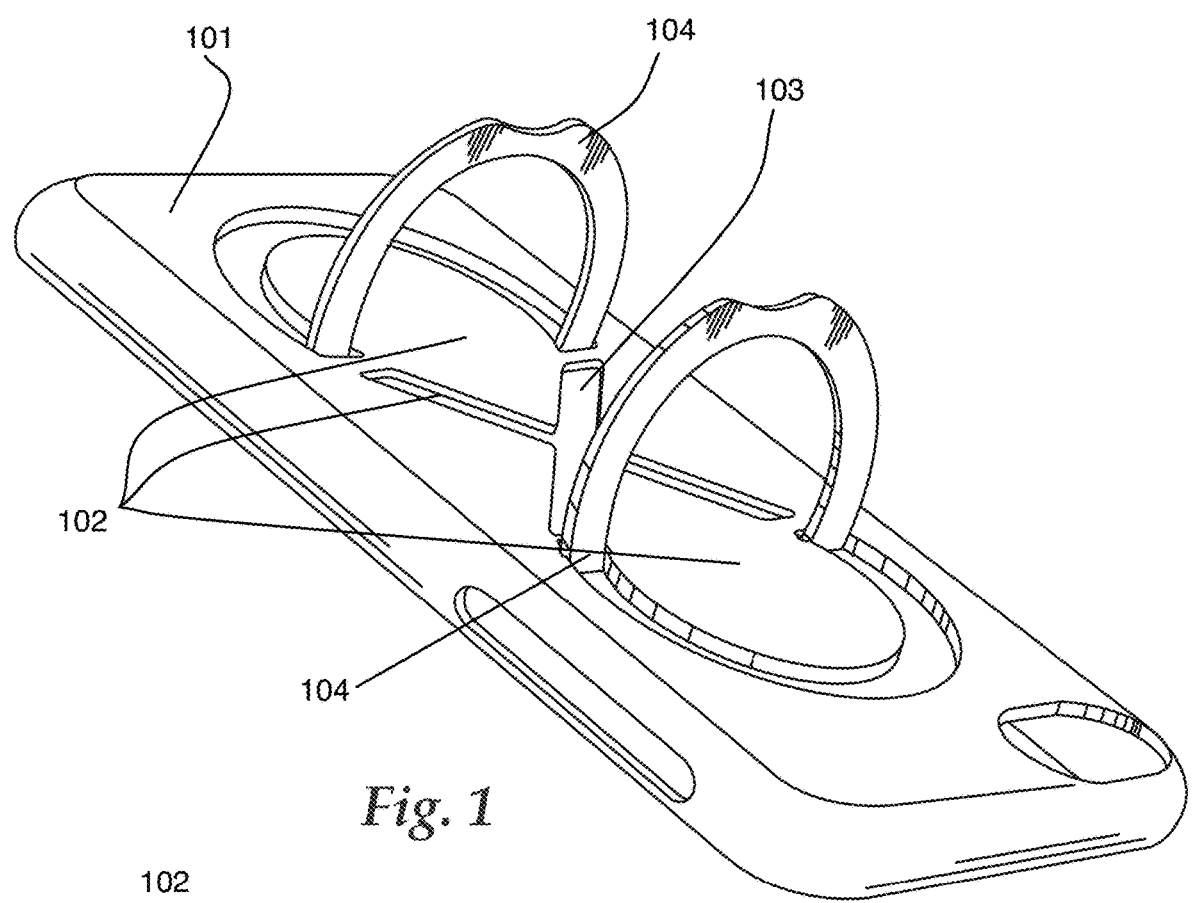
FIG. 1 shows an illustrative embodiment of a first mount that is configured to attach to a second mount.

A rotationally limited connection system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention include a connection system, such as a rotationally limited connection system. In at least one embodiment, the system may be used as part of a mobile phone case, but may additionally be used for the connection of any relatively small and portable device. By way of one or more embodiments, the connection system connects a first mount to a second mount. Similarly, in at least one embodiment, the system may be used to connect a small device to things, or items, such as a bicycle or motorcycle handlebars, vehicle dashboard or similar, computer monitor, and the like. According to one or more embodiments, the system may be used to connect a small device anywhere that it may be inconvenient to hold the small device, e.g., a phone or other device, such as when two hands are needed. Specifically, in at least one embodiment, the system may be employed as a connection system between a first mount embodied as a mobile phone case and a second mount connected to a vehicle console/dash/handlebar or to a Go-Pro® accessory.

As shown in FIGS. 1-8, by way of at least one embodiment, the connection system of a first mount embodied as a cell-phone case is formed as a cross or x-shaped recess in the case, flanked by third mechanical coupling elements illustrated as flip-out connectors hingedly connected to the first mount, shown here as arc shaped connectors. In one or more embodiments, the third mechanical coupling elements rotate and may be snapped, frictionally connected, or otherwise engaged or connected into place on the second mount, holding the device secured within the first mount in place. In one or more embodiments, such a second mount includes a corresponding cross or x-shaped protrusion that mates with the cross or x-shaped recess in the first mount. It should be noted however, by way of at least one embodiment, that the mating recess and protrusion may be any shape or configuration, and may be reversed without straying from the scope of this invention. In one or more embodiments, there may be a secure connection between the mating recess and protrusion connection structure so that they are held together without being secured by the third mechanical coupling elements. In at least one embodiment, a magnet may be used, or the connection may be frictional "press fit" between walls of the protrusion and recession, or the connection may be made by a snap-fit, among other options. At least one embodiment may include a magnet connection, wherein a magnet may be positioned in or adjacent to either or both of the recessed or protruding side of the mating recess and protrusion structure.

A second mount is shown in FIGS. 15-22, according to one or more embodiments of the invention. In these views, by way of at least one embodiment, the protrusion extends from the top of the second mount to engage with the first mount. In one or more embodiments, on the sides of the second mount, areas are formed to receive the third mechanical coupling elements (such as the arch shaped connectors of FIGS. 1-8). By way of at least one embodiment, these third mechanical coupling elements may use tension to hold the connection together between the first mount and the second mount. In at least one embodiment, the a first object may be secured by the first mount, which may be connected to the second mount, which is in turn connected to a second object, such as bicycle handlebars, thereby allowing a user to view the first object (e.g., a phone or other small device) while bicycling, for example, for global positioning system ("GPS") turn-by-turn direction purposes.

FIGS. 9-14 provide views of a second mount that may be connected to or otherwise engaged with standard Go-Pro® accessories, according to one or more embodiments of the invention. In at least one embodiment, a flange and screw connection system may be used to engage with Go-Pro® accessories, wherein the second mount includes a stem which may engage with this system, the stem in the form of one or more flanges defining a screw hole aperture. On the opposite side of the second mount, by way of one or more embodiments, the protrusion extends from the top to engage with the recess on the first mount. On the sides of the second mount, by way of at least one embodiment, shoulder areas are formed to receive the third mechanical coupling elements (such as the arch-shaped connectors of FIGS. 1-8).

While specific embodiments of the connection system have been shown, it should be understood that the mating shape of the shoulder areas coupled with the hinged third mechanical coupling elements may be used to connect any number of structures, according to one or more embodiments of the invention. At least one embodiment of the invention contemplates any connection structure that includes two matings—a protrusion mating with a recession—as well as a hinged third mechanical coupling element, such as the arch-shaped one shown in the Figures mating with a shoulder area. While a first mount embodiment comprising a cellular phone case is given as a specific example herein, it should be understood that the connection system may be used to connect any number of things, by way of at least one embodiment. In one or more embodiments, this may include, but is not limited to, cameras, external batteries, wallets, business card holders, portable electronic devices, and the like. By way of at least one embodiment, these things may be connected to a vehicle, helmet, or other accessory, or may be used to connect to each other (such as a phone case connectable to an external battery pack) using the connection system. In at least one embodiment, the connection system need not be used to connect a phone or other device to a vehicle or other structure. In one or more embodiments, the connection system may also be used to connect two elements together for interactive function. For example, in at least one embodiment, a first mount embodiment comprising a cell phone case using the connection system may connect to the external battery, wallet, business card holder, an arm band or other accessory, and the like.

It should be understood that, by way of one or more embodiments, the shape of both the mating connection structure of the protrusion of the first mount mating with a recession of the second mount as well as the hinged third mechanical coupling element of the first mount mating with a shoulder area of the second mount may vary without straying from the scope of the present invention. Further, it should be understood that in one or more embodiments, connection between two elements may be made only by the mating connection structure, or only by the hinged connectors.

In one or more embodiments, the third mechanical coupling element may be used as a stand to prop up a device secured by the first mount, such as a cell phone, held within the first mount equipped with the connection system. In at least one embodiment, the third mechanical coupling element may be hingedly connected to a body of the first mount. In at least one embodiment, the hinged connection may have a sufficient amount of friction such that the third mechanical coupling element may be extended and hold itself in place against a force, such as a force of a weight of the device secured by the first mount.

FIG. 1 shows an illustrative embodiment of a connection system. The first mount 101 may be configured to hold a first object such as a mobile phone or to be coupled to a first object such as a mobile phone. The first mount 101 may for example be integrated into or may form a mobile phone case, with elements incorporated into the first mount 101 to enable connection to the first object. One or more embodiments may enable connection of any object to another object using a connection system similar to the system illustrated in FIG. 1. The connection system may be modular in that the first mount 101 may be coupled to various objects that are secured to compatible second mounts.

FIG. 1 shows a view of the first mount 101 from the back; in an embodiment, the screen of a phone installed into the first mount 101 is visible from the front side. The back side of the first mount 101 includes features that support connection to compatible components of a second mount that may be attached to other objects, including for example, without limitation, a bicycle, a motor bike, a vehicle, a wall, a counter, a piece of furniture, an appliance, an article of clothing, an accessory, a camera, a camera accessory, a wallet, a purse, a backpack, a bag, a suitcase, a briefcase, a computer, or a charging system.

FIG. 1 shows three connection features that are integrated into illustrative first mount 101. One or more embodiments may include only a subset of these features. First ferromagnetic coupling elements 102 are integrated into or coupled to one or more portions of the first mount 101. These first ferromagnetic coupling elements 102 may include any ferrous or ferromagnetic materials, for example. The first ferromagnetic coupling elements 102 may be configured to couple with mating magnetic features on corresponding second mounts on other objects, such as those described below with respect to FIGS. 9 through 22. The first ferromagnetic coupling elements 102 may be for example permanent magnets or materials that are attracted to magnets. The first ferromagnetic coupling elements 102 on a first mount may be of any polarity or polarities that provide attraction to corresponding first ferromagnetic coupling elements on a second mount.

A second connection feature in first mount 101 is the first mechanical coupling element 103, embodied as an X-shaped indentation in the back face of the first mount 101. This first mechanical coupling element 103 is configured to couple with a mating second mechanical coupling element on a second mount, embodied as an X-shaped part with a corresponding protrusion that fits into the first mechanical coupling element 103. In one or more embodiments, the protruding element may be in the first mount 101, and the corresponding indentation element may be in the second mount. In one or more embodiments, the first mount 101 may have a combination of protrusions and indentations that mate with complementary protrusions and indentations on the second mount. The mechanical coupling between first mechanical coupling element 103 and the corresponding protruding second mechanical coupling element in a mating second mount provides a connection between first mount 101 and its corresponding second mount. In one or more embodiments the connection may be a press-fit that provides frictional coupling between the first and second mounts. In one or more embodiments some or all of the first ferromagnetic coupling elements 102 may be integrated into the first mechanical coupling element 103. For example, the sides or bottom of the first mechanical coupling element 103 may be magnetic, and the corresponding protruding second mechanical coupling element on a mating second mount may be magnetic of opposite polarity or polarities.

The X-shape of the first mechanical coupling element 103 provides several benefits for the connection system. When the first mechanical coupling element 103 is connected to a corresponding X-shaped protruding second mechanical coupling element on a mating second mount, the first mount 101 cannot rotate freely. In addition, the coupling resists shear forces in all directions, due to the X-shape of the coupling. Finally, the X-shape of the first mechanical coupling element 103 allows the first mount 101 to be de-coupled and rotated 90, 180, or 270 degrees with respect to the mating second mount before being re-coupled; this allows the object secured in the first mount 101 to be viewed in a landscape or portrait mode, for example. A user may couple the first mount 101 to the second mount in one orientation, and then decouple the first mount 101, rotate the first mount 101 by any multiple of 90 degrees, and re-couple the first mount 101 to the second mount.

The X-shape of the first mechanical coupling element 103 is illustrative; one or more embodiments may use different geometries for the mechanical coupling elements that provide resistance against rotation and shear forces. For example, in one or more embodiments the X-shaped first mechanical coupling element 103 may be a square instead of an X; the square shape also resists rotation and shear and provides for rotation of the mount orientation in any multiple of 90 degrees. More generally, one or more embodiments may incorporate indentation features that are bounded by any regular polygon, which resists rotation but allows any desired angular position of the first mount 101 with respect to its mating second mount. For example, an octagonally shaped feature allows the first mount 101 to be de-coupled and rotated by any multiple of 45 degrees prior to re-coupling it to the corresponding second mount.

A third connection feature in first mount 101 is the pair of third mechanical coupling elements 104, for example illustrated as C-shaped or arc-shaped hooks or clamps. These third mechanical coupling elements 104 may be configured for example to fit over and latch to corresponding shoulder features on a second mount to provide an additional mechanical coupling. This mechanical coupling may for example resist motion in a direction perpendicular to the plane of the back face of first mount 101, while the X-shaped indentation 103 may resist motion along this plane. In the embodiment shown in FIG. 1, the third mechanical coupling elements 104 are connected to the first mount 101 with hinges that allow them to rotate flat against the back of the first mount 101, or to rotate and extend perpendicular to the back of the first mount 101 as shown in FIG. 1. The back of first mount 101 may contain indentations into which the third mechanical coupling elements 104 fit when rotated toward the first mount 101, so that the back of the first mount 101 is flat when the third mechanical coupling elements 104 are not rotated away from the first mount 101. The third mechanical coupling elements 104 may also persist in their rotated out position, to function as a stand for the first mount 101.

Figure 2:
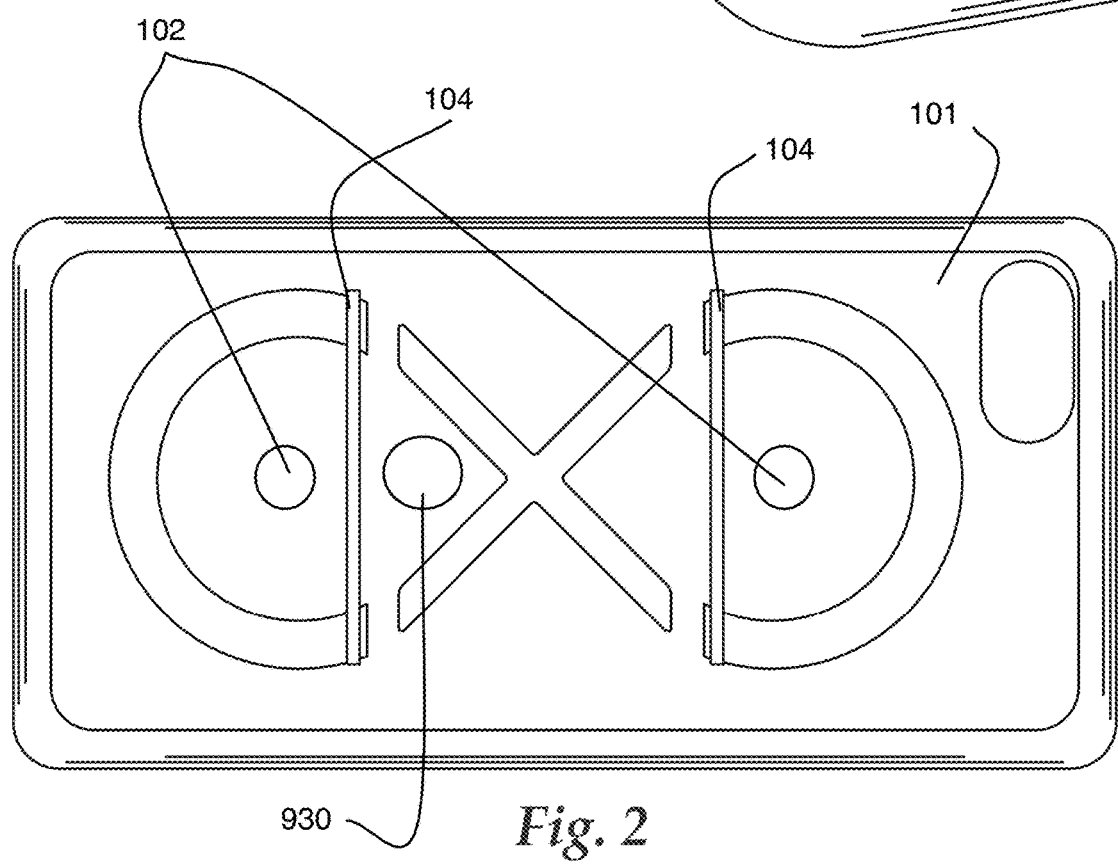
FIG. 2 shows the first mount of FIG. 1, as viewed from the back.

FIG. 2 shows a view of first mount 101 looking directly from the back of the first mount 101. First ferromagnetic coupling elements 102 may be for example located inside the indentations that hold the third mechanical coupling elements 104. FIG. 2 also shows that in one or more embodiments the first mount 101 may contain one or more inductive charging coils 930. The coil or coils 930 may for example transfer power to the phone installed in the first mount 101 when the first mount 101 is coupled to a second mount that holds a component that provides power inductively via mating inductive charging elements. A mating charging element may be for example a battery that couples to the first mount 101, a charging station with connections that mate with the first mount 101, or a second mount that includes a power transfer capability.

Figure 3:
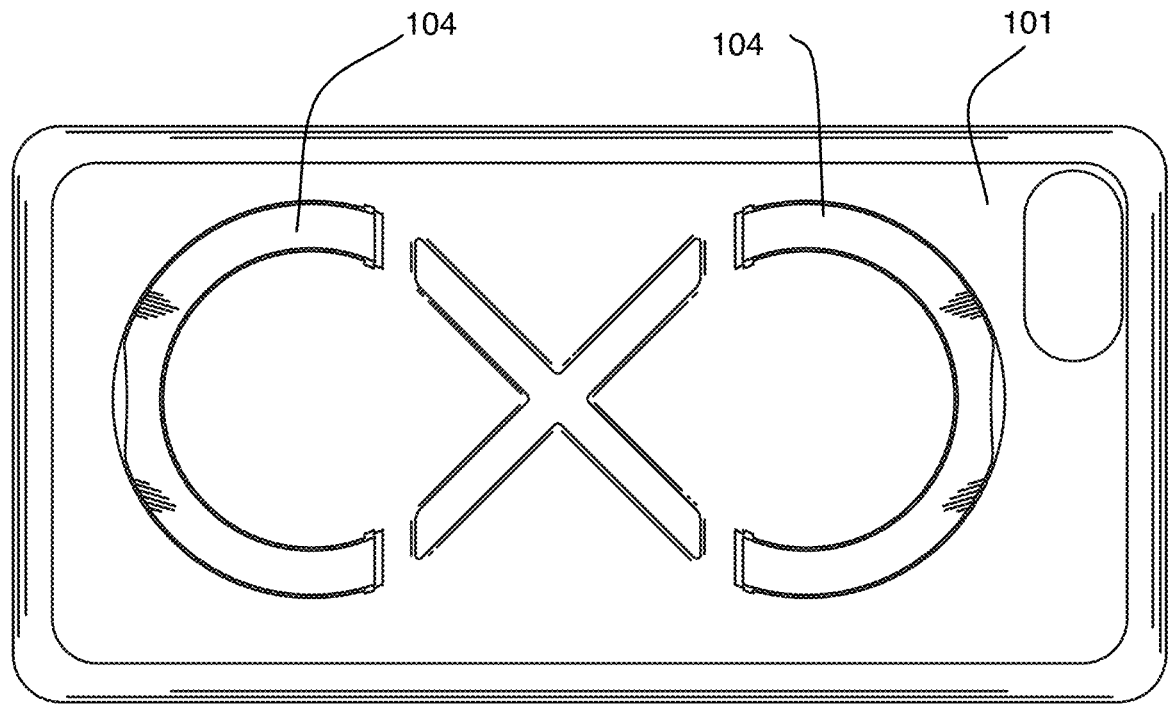
FIG. 3 shows the back view of the first mount of FIG. 2 with the mechanical coupling element retracted.

In FIGS. 1 and 2, the third mechanical coupling elements 104 are shown in their extended position. FIG. 3 shows the same back view of the first mount 101 as FIG. 2, but the third mechanical coupling elements 104 are folded back into the corresponding indentations so that they lie flat on the back of the first mount 101.

Figure 4:
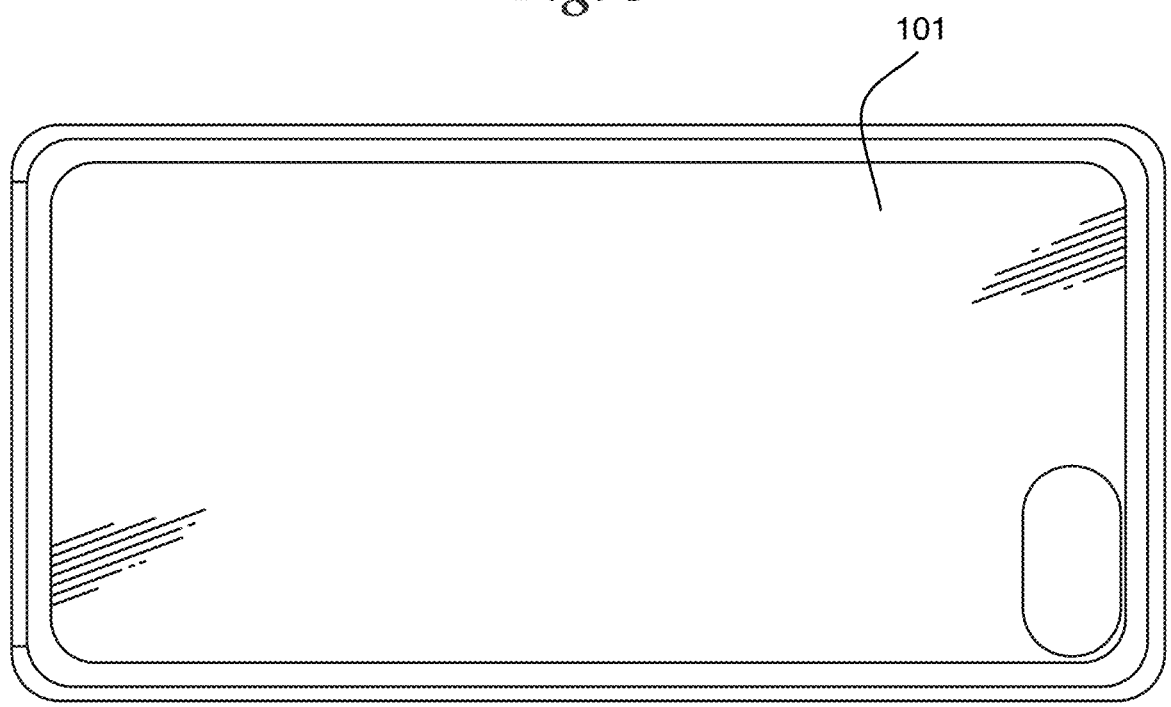
FIG. 4 shows a front view of the first mount of FIG. 1.

FIG. 4 shows a front view of the first mount 101. The connection features are not visible from this view because they are all coupled to the back of the first mount 101.

Figure 5:
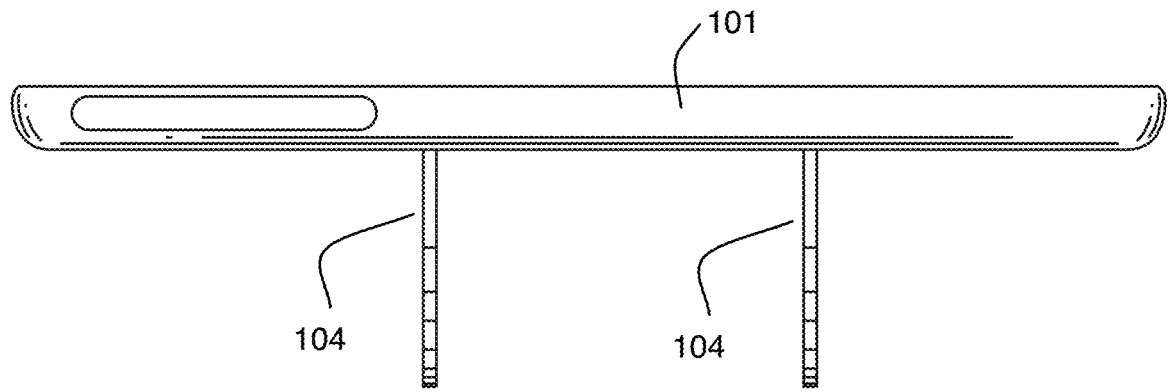
FIG. 5 shows a left side view of the first mount of FIG. 1.
Figure 6:
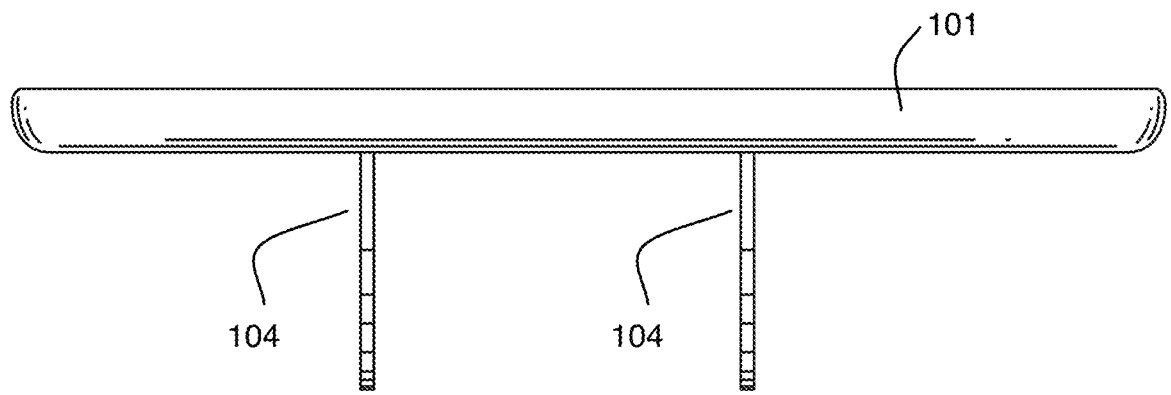
FIG. 6 shows a right side view of the first mount of FIG. 1.

FIGS. 5 and 6 show side views of the first mount 101 with the third mechanical coupling elements 104 in their extended positions.

Figure 7:
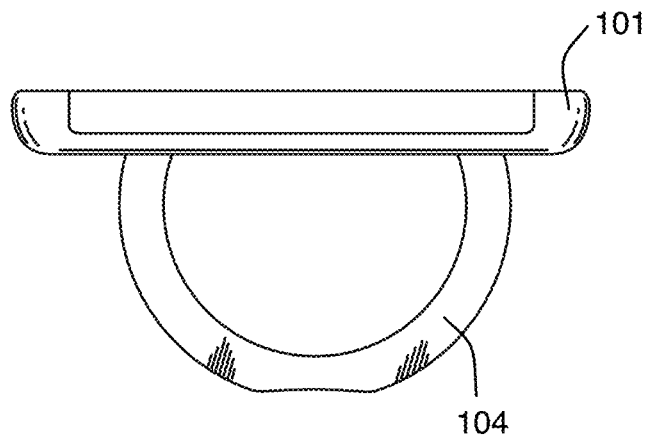
FIG. 7 shows a top view of the first mount of FIG. 1.

FIG. 7 shows a top view of the first mount 101, with the third mechanical coupling elements 104 in their extended positions.

Figure 8:
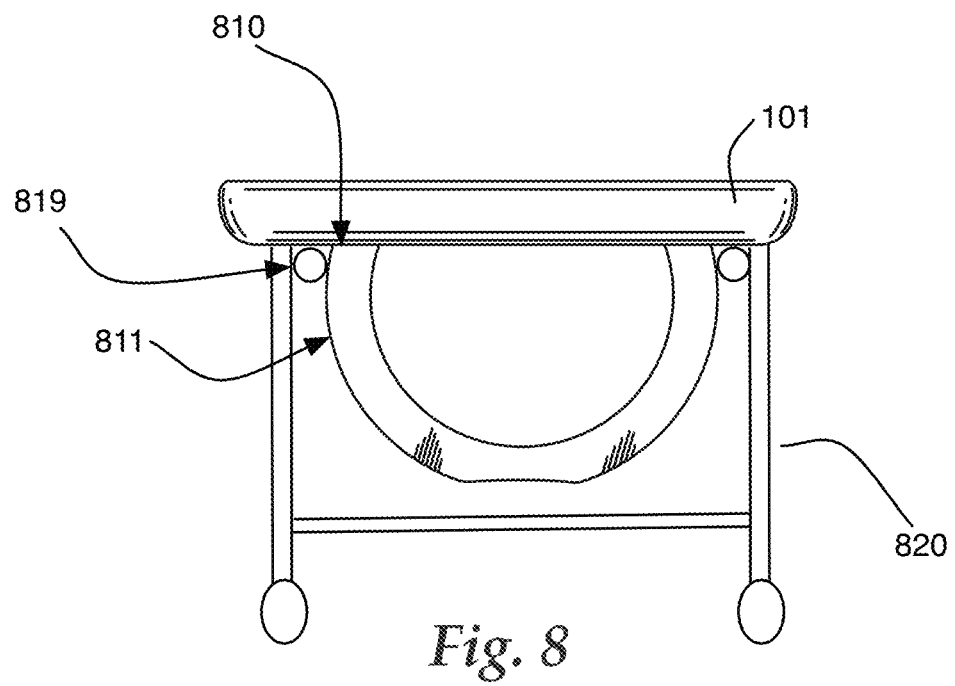
FIG. 8 shows a bottom view of the first mount of FIG. 1.

FIG. 8 shows a vent mount with extension legs 820 that fit into a car vent for example. The third mechanical coupling elements 104 are wider at point 811 along their arc than at point 810, so the vent mount indent 819 bends legs 820 as the vent mount indent 819 moves over wider portion 811 and moves to the potential well at 810 to lock the ring into place.

In one or more embodiments, the first mount 101 that secures an object, such as first mount 101 for a mobile phone, connects to a corresponding second mount 901 that couples to or holds a second object. The second mount 901 interfaces between the first mount 101 and a second object, surface, or system. The features of the second mount 901 correspond to the features of the second object. A second mount 901 may couple to or hold any second object, enabling attachment of a first object such as a mobile phone to any other second object. FIGS. 9 through 14 illustrate a second mount 901 that couples to a Go-Pro® or similar camera, and FIGS. 15 through 22 illustrate a second mount 901 that couples to a bicycle or motor bike handle. These second mounts 901 are illustrative; one or more embodiments may include or may interface with second mounts 901 that couple to or hold any other second object, and that allow a first object such as a mobile phone or other first object to be attached to the second mount 901 and thereby the second object.

Figure 9:
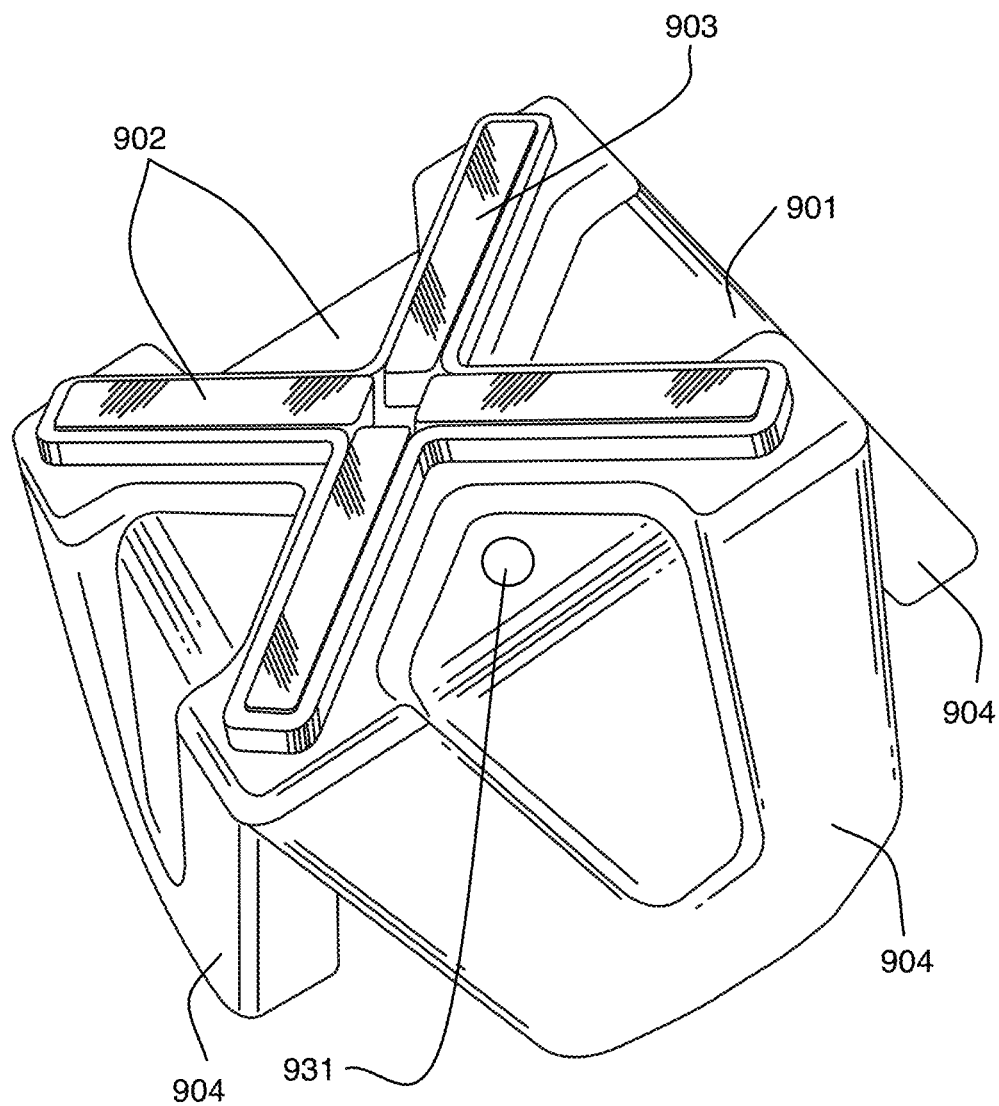
FIG. 9 shows an illustrative embodiment of a second mount that receives and couples to the first mount of FIG. 1; the second mount shown in FIG. 9 attaches to a Go-Pro® accessory or a similar device.

FIG. 9 shows an illustrative embodiment of a second mount 901 that couples to an action camera, e.g., a Go-Pro® or similar camera system. The second mechanical coupling element 903 embodied as an X-shaped protrusion fits into the corresponding first mechanical coupling element 103 embodied as an X-shaped indentation in the first mount 101, providing a mechanical coupling between the first mount 101 (such as a mobile phone case) and the second mount 901. A second ferromagnetic coupling element 902 provides magnetic attraction to the corresponding first ferromagnetic coupling element 102 in the first mount 101. Second ferromagnetic coupling elements 902 may be for example permanent magnets or materials attracted to corresponding magnets or materials 102. Magnetic polarities of second ferromagnetic coupling elements 902 and 102 may be configured to provide attraction between the two elements; for example, elements that are in contact or proximal when attached may be magnets of opposite polarities. The second ferromagnetic coupling element 902 can be in or on the second mechanical coupling element 903 or next to the second mechanical coupling element 903. In one or more embodiments, a coil 931 may be anywhere on the second mount 901, here shown on the base element, and may be utilized for inductively charging another device coupled to the second mount 901. Fourth mechanical coupling elements 904 couple to the corresponding third mechanical coupling elements 104 on first mount 101, embodied as a shoulder 904 on second mount 901. The fourth mechanical coupling element 904 is shown on four sides of the illustrated embodiment (only three sides are visible in FIG. 9), so that third mechanical coupling elements 104 may rotate and snap on to fourth mechanical coupling elements 904 in different orientations. The two third mechanical coupling elements 104 may attach to either pair of opposite fourth mechanical coupling elements 904. This allows the second mount 901 to be in a fixed orientation, while the first mount 101 may be de-coupled and rotated in 90-degree increments and then re-coupled to the second mount 901.

Figure 10:
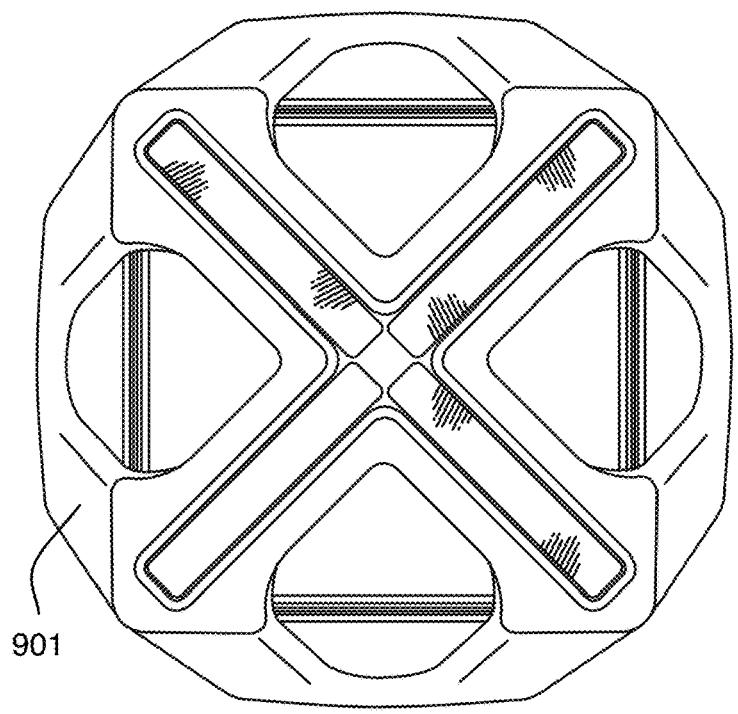
FIG. 10 is a top view of the second mount of FIG. 9.
Figure 11:
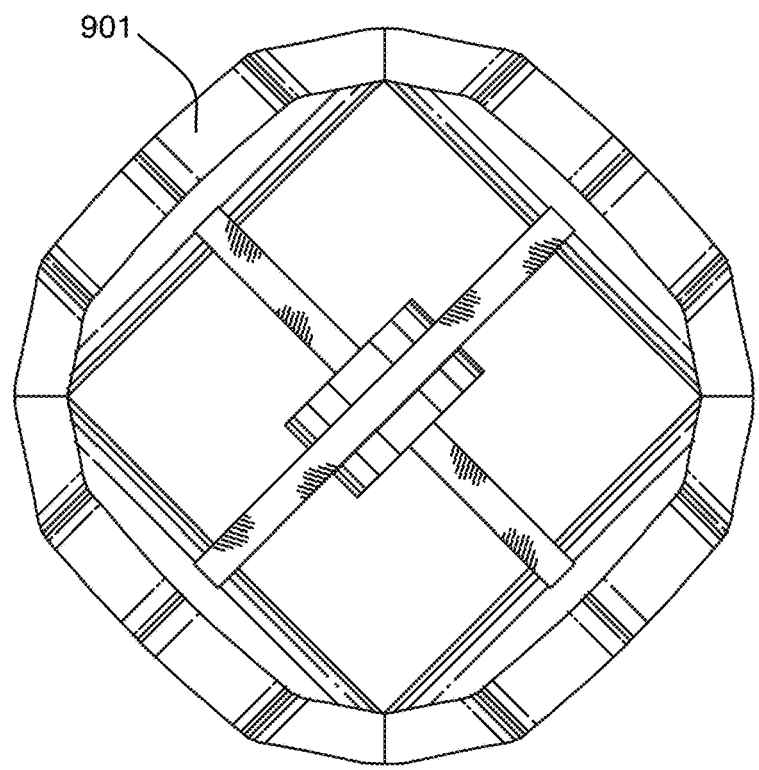
FIG. 11 is a bottom view of the second mount of FIG. 9.
Figure 12:
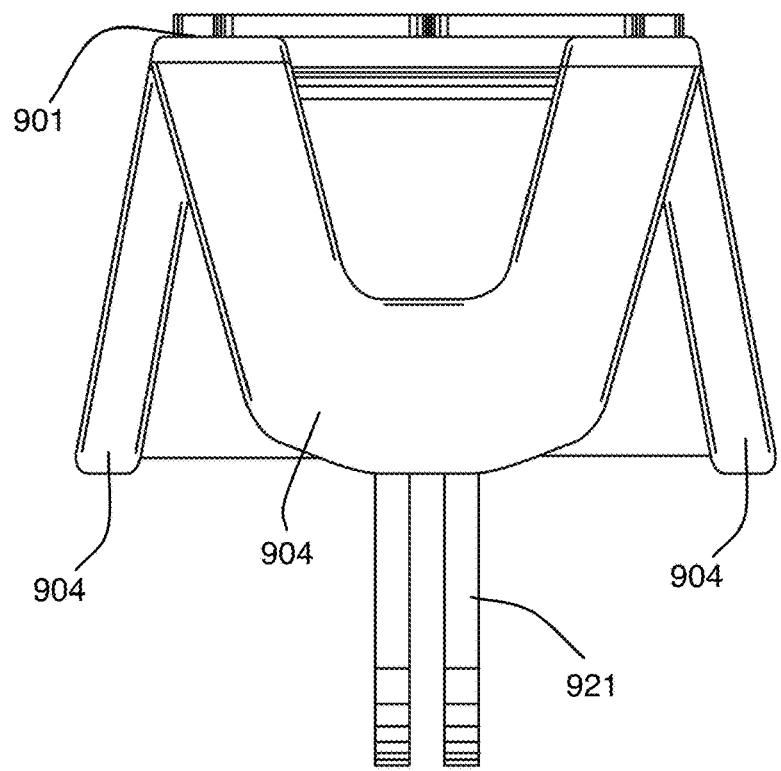
FIG. 12 is a front side view of the second mount of FIG. 9.
Figure 13:
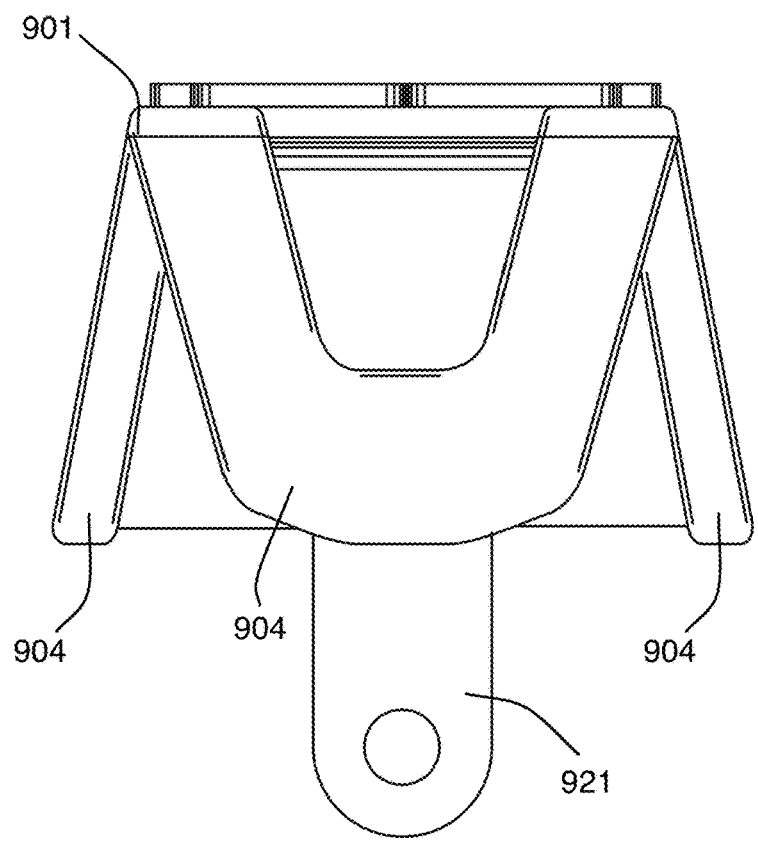
FIG. 13 is a right side view of the second mount of FIG. 9.
Figure 14:
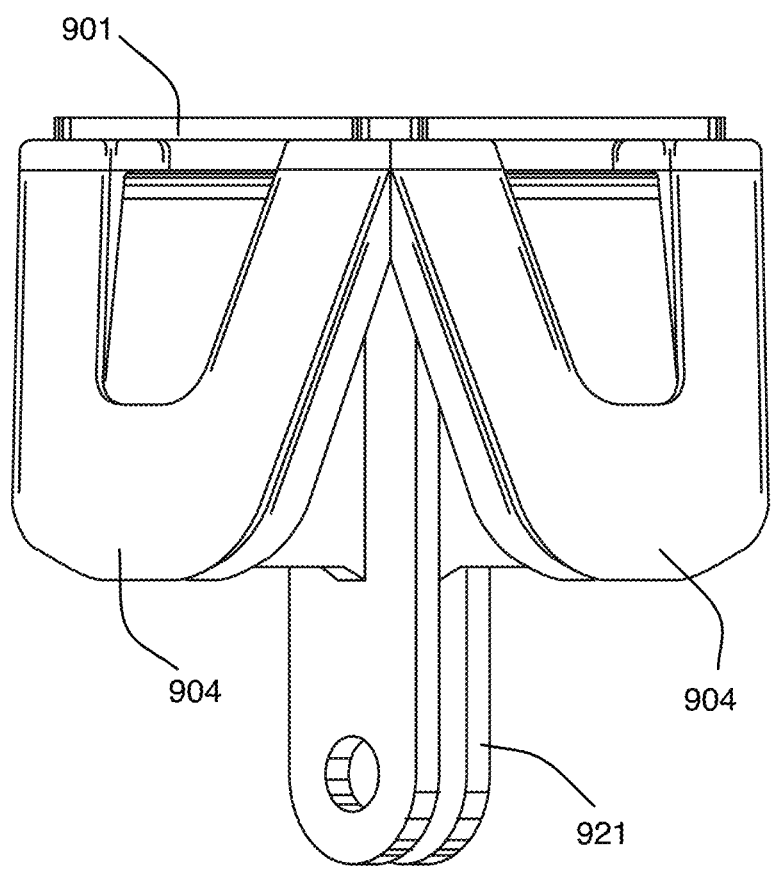
FIG. 14 is another side view of the second mount of FIG. 9, rotated 45 degrees from the right side view.

FIGS. 10 through 14 show different views of the second mount 901. FIG. 10 is a top view and FIG. 11 is a bottom view. FIG. 12 is a front side view; FIG. 13 is a right side view, which is rotated 90 degrees from the view of FIG. 12. FIG. 14 is another side view, which is rotated 45 degrees from the view of FIG. 13. In FIGS. 12 and 13, three of the four fourth mechanical coupling elements 904 are visible. In FIG. 14, two of the four fourth mechanical coupling elements 904 are visible. These four fourth mechanical coupling elements 904 have identical or similar shapes to allow the third mechanical coupling elements 104 to attach to any opposite pairs of the fourth mechanical coupling elements 904. Flanges 921 shown in FIGS. 12, 13, and 14 provide a coupling to a Go-Pro® or similar action camera system; these flanges 921 may be modified in one or more embodiments to provide for attachment to any other object or system.

FIGS. 15 through 22 show an illustrative embodiment of a second mount 1701 that attaches for example to a bicycle handlebar or motorized bike handlebar. This second mount 1701 has similar features to the second mount 901 illustrated above for a Go-Pro® system, enabling attachment to a first mount 101 securing a mobile phone or a similar first mount 101 for any other object.

Figure 15:
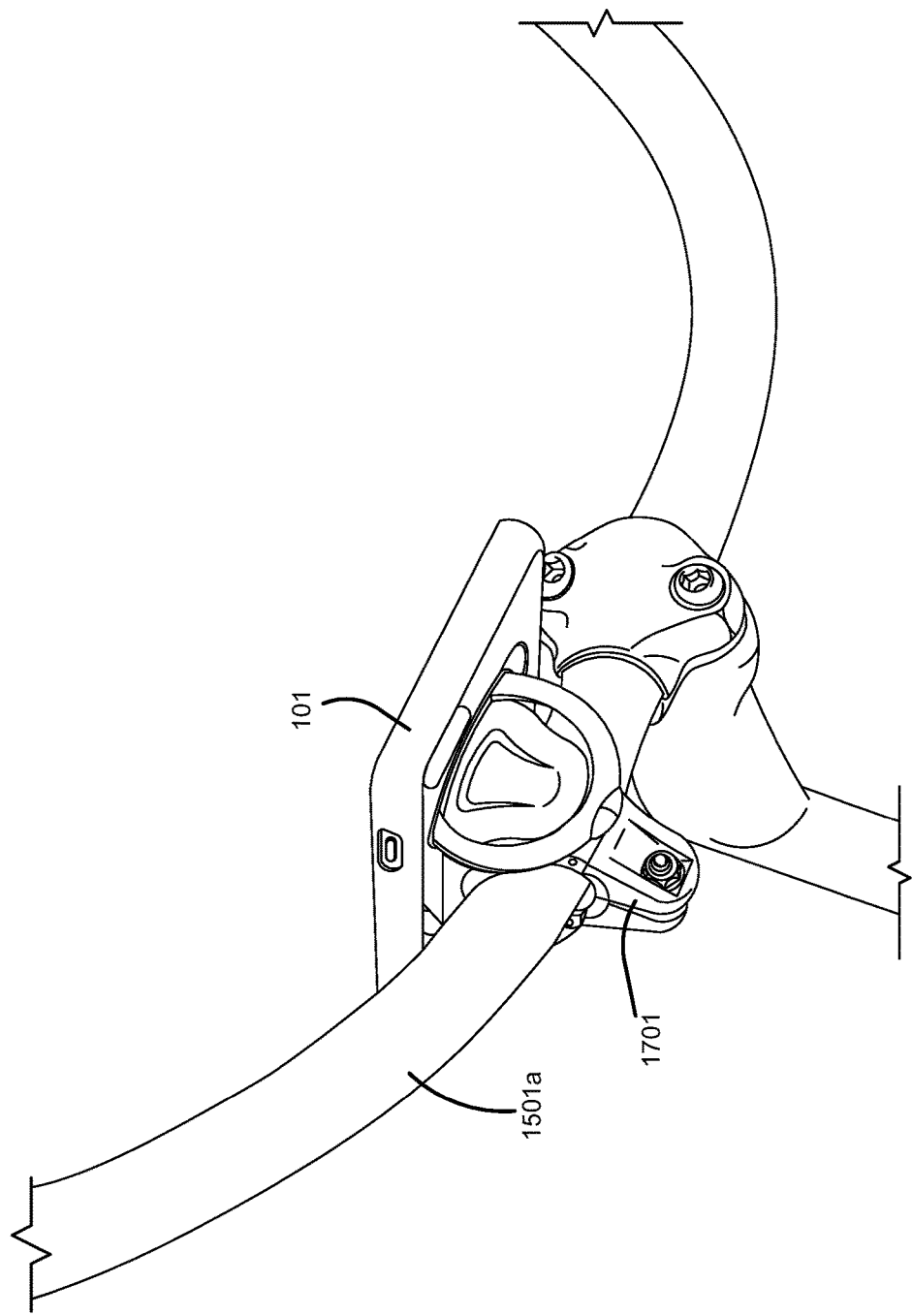
FIG. 15 shows the first mount of FIG. 1 coupled to a second mount that is attached to a bicycle handle bar.
Figure 16:
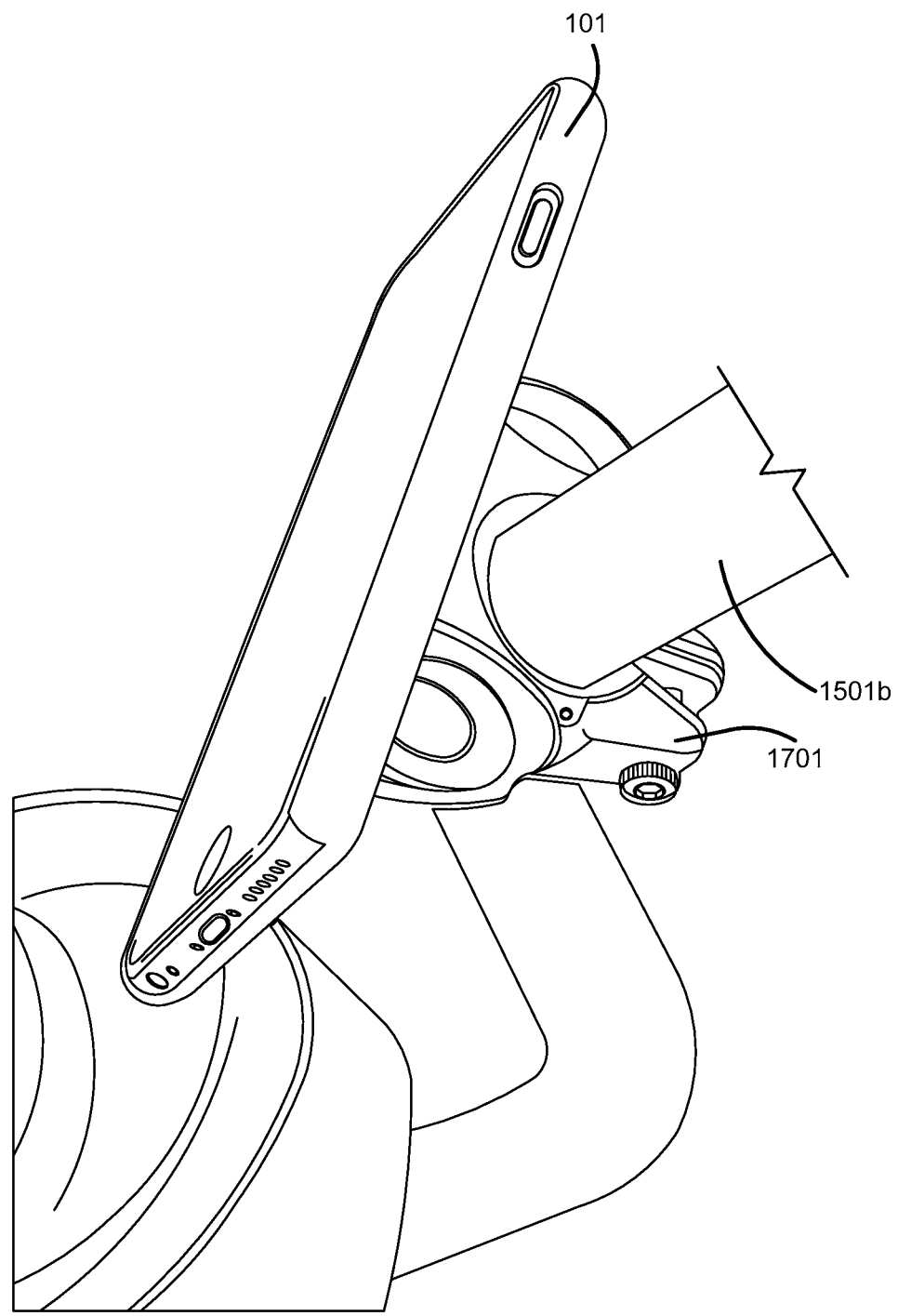
FIG. 16 shows the first mount of FIG. 1 coupled to a second mount that is attached to a motorized bike handle bar.

FIG. 15 shows second mount 1701 coupled to a handlebar 1501a of a bicycle, with first mount 101 holding a mobile phone and coupled to the second mount 1701. FIG. 16 shows second mount 1701 coupled to a handlebar 1501b of a motorized bike, with first mount 101 holding a mobile phone and attached to the second mount 1701.

Figure 17:
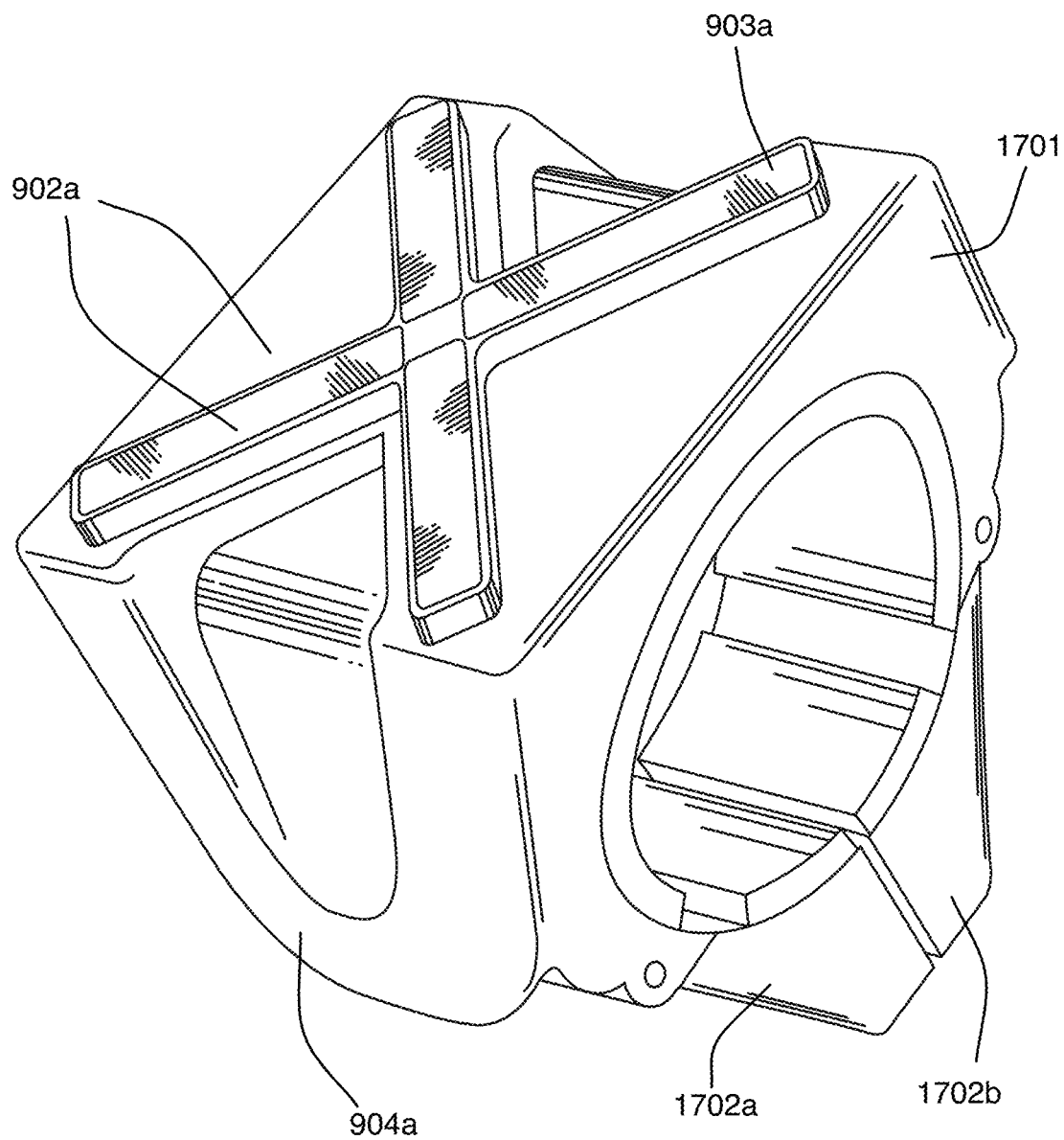
FIG. 17 shows a perspective view of an illustrative embodiment of a second mount that mates with a first mount, viewed from the top.

FIG. 17 shows the coupling elements of second mount 1701. Second ferromagnetic coupling elements 902a provide magnetic coupling to the corresponding first ferromagnetic coupling elements 102 of first mount 101. Second mechanical coupling element 903a fits into corresponding first mechanical coupling element 103 of first mount 101, providing a mechanical coupling that resists rotation and shear forces. Fourth mechanical coupling elements 904a couple to the third mechanical coupling elements 104, providing a mechanical coupling that resists motion perpendicular to the face of the first mount 1701. (The fourth mechanical coupling elements 904a are on opposite sides of second mount 1701, but only one is visible in FIG. 17.) Clamps 1702a and 1702b provide attachment to the handlebar.

Figure 18:
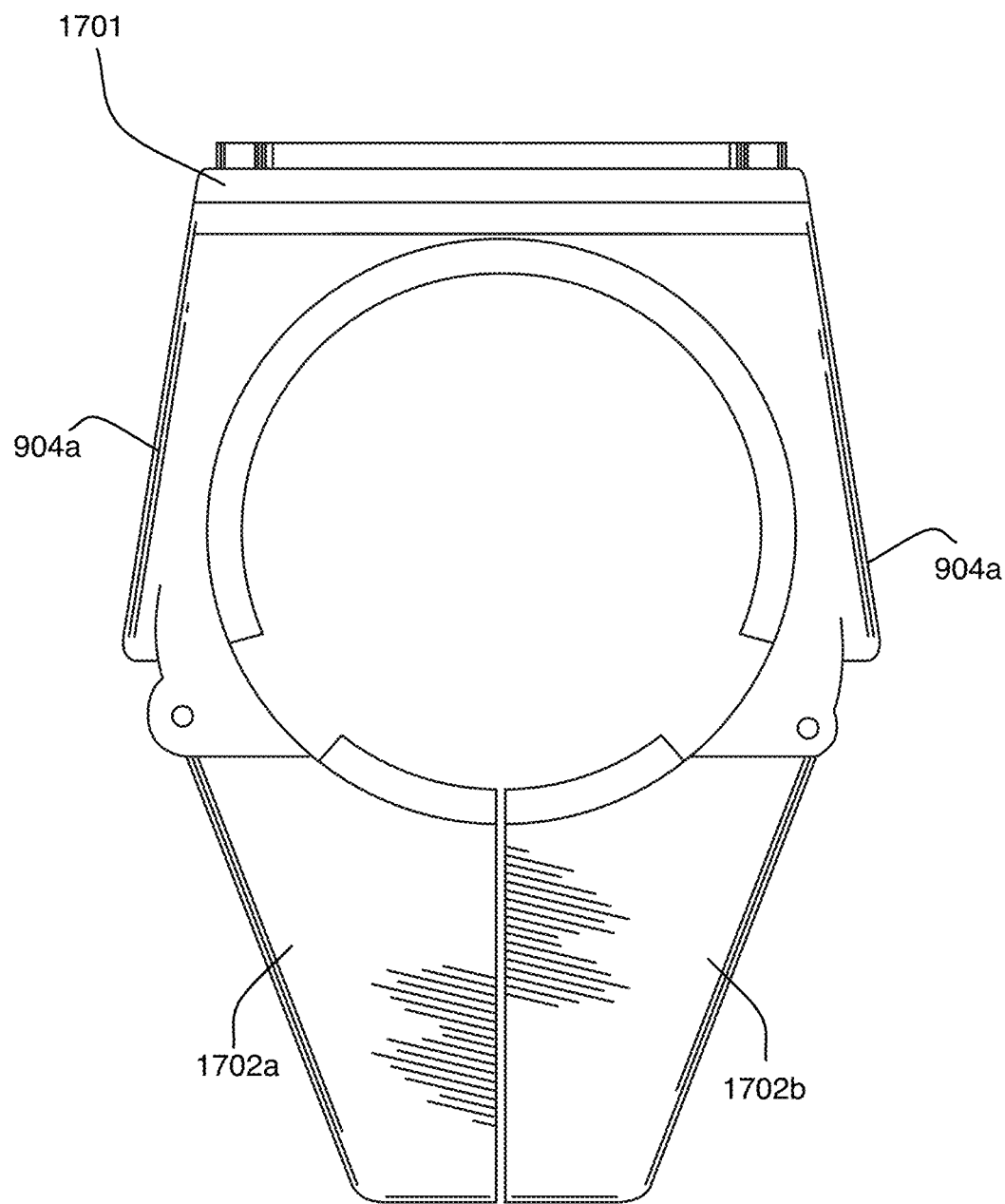
FIG. 18 shows a left side view of the second mount of FIG. 17.
Figure 19:
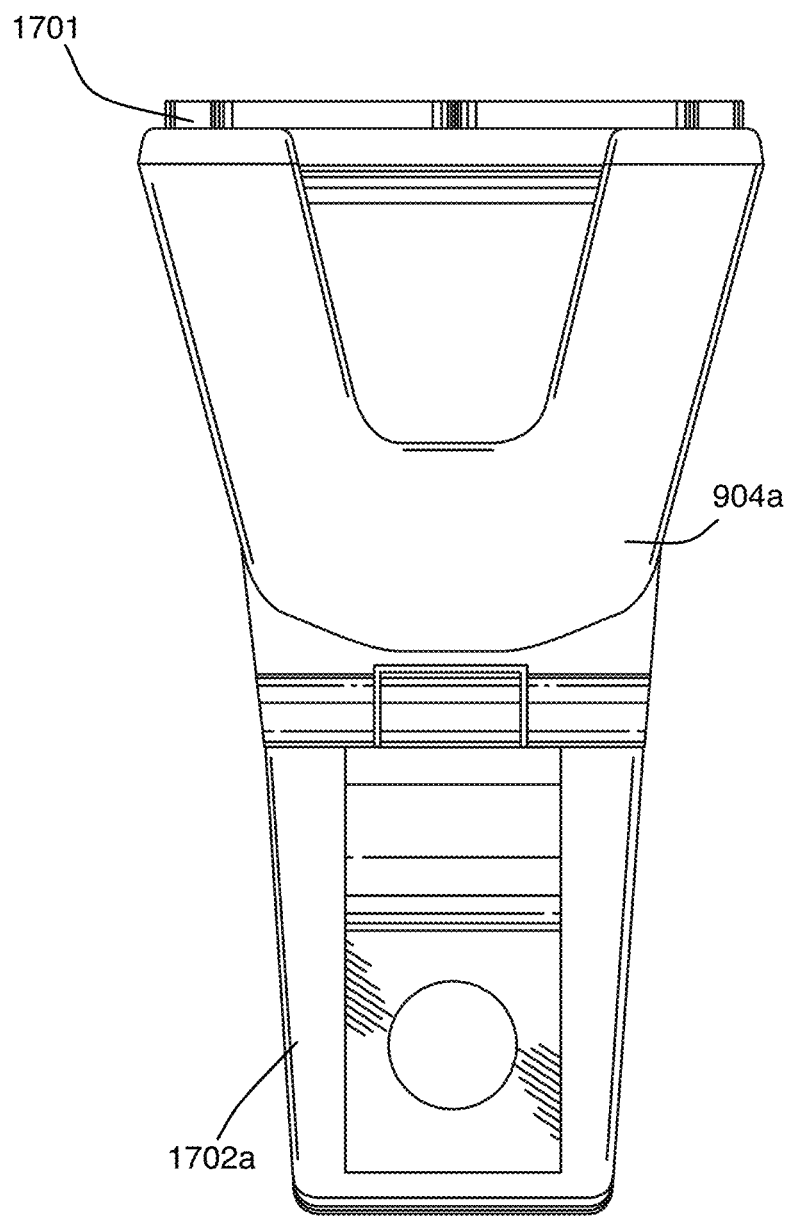
FIG. 19 shows a front view of the second mount of FIG. 17.
Figure 20:
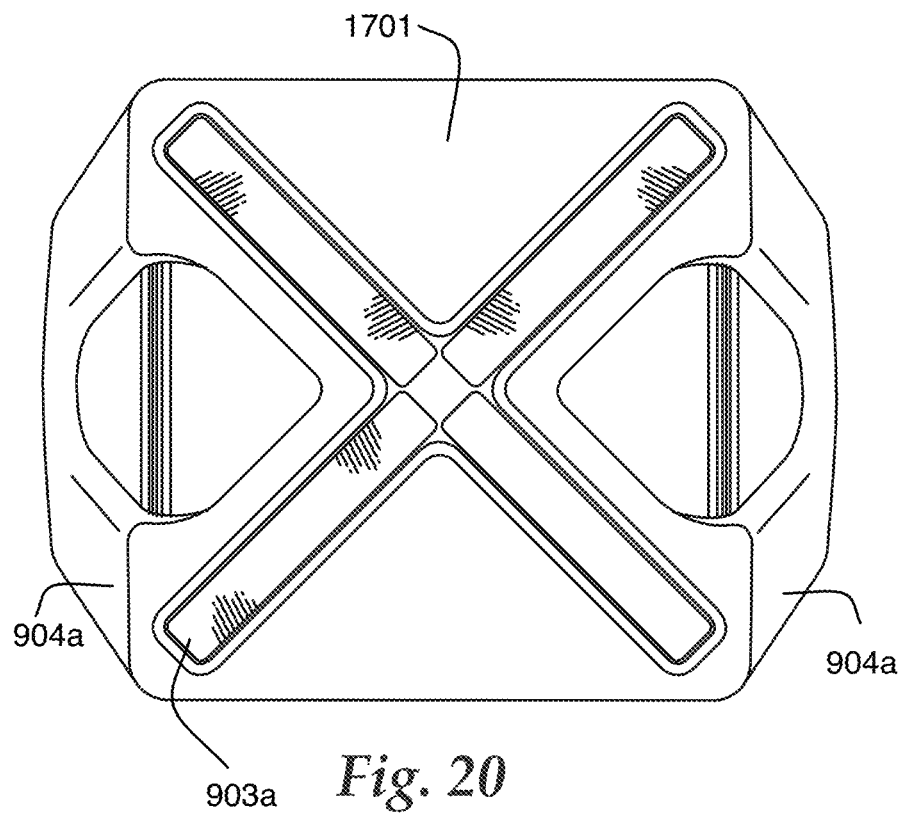
FIG. 20 shows a top view of the second mount of FIG. 17.
Figure 21:
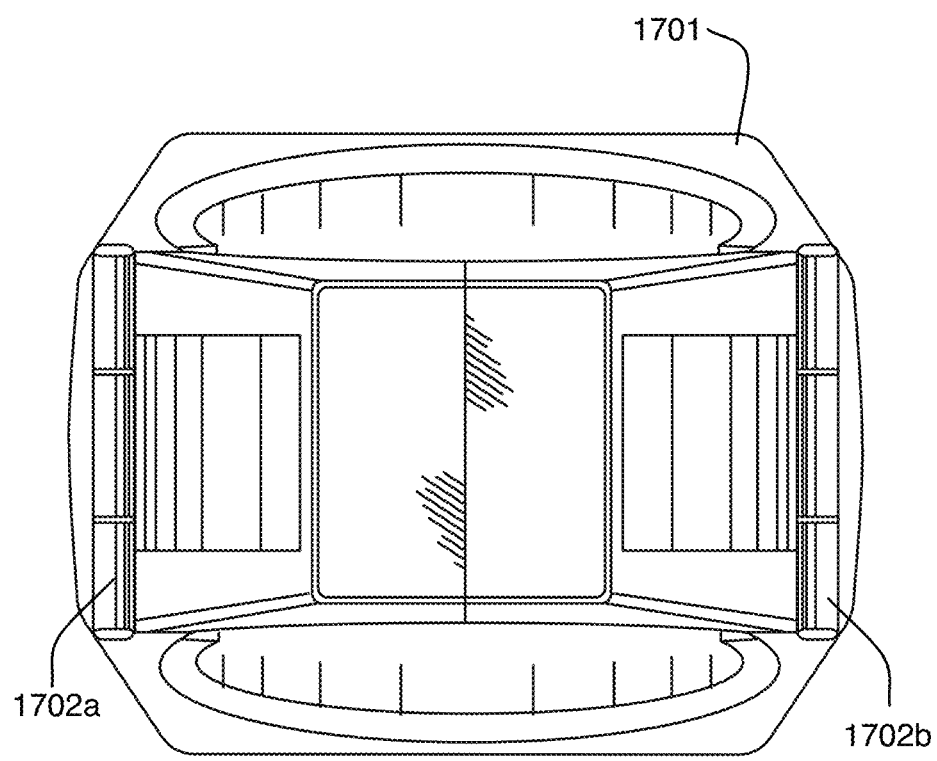
FIG. 21 shows a bottom view of the second mount of FIG. 17.
Figure 22:
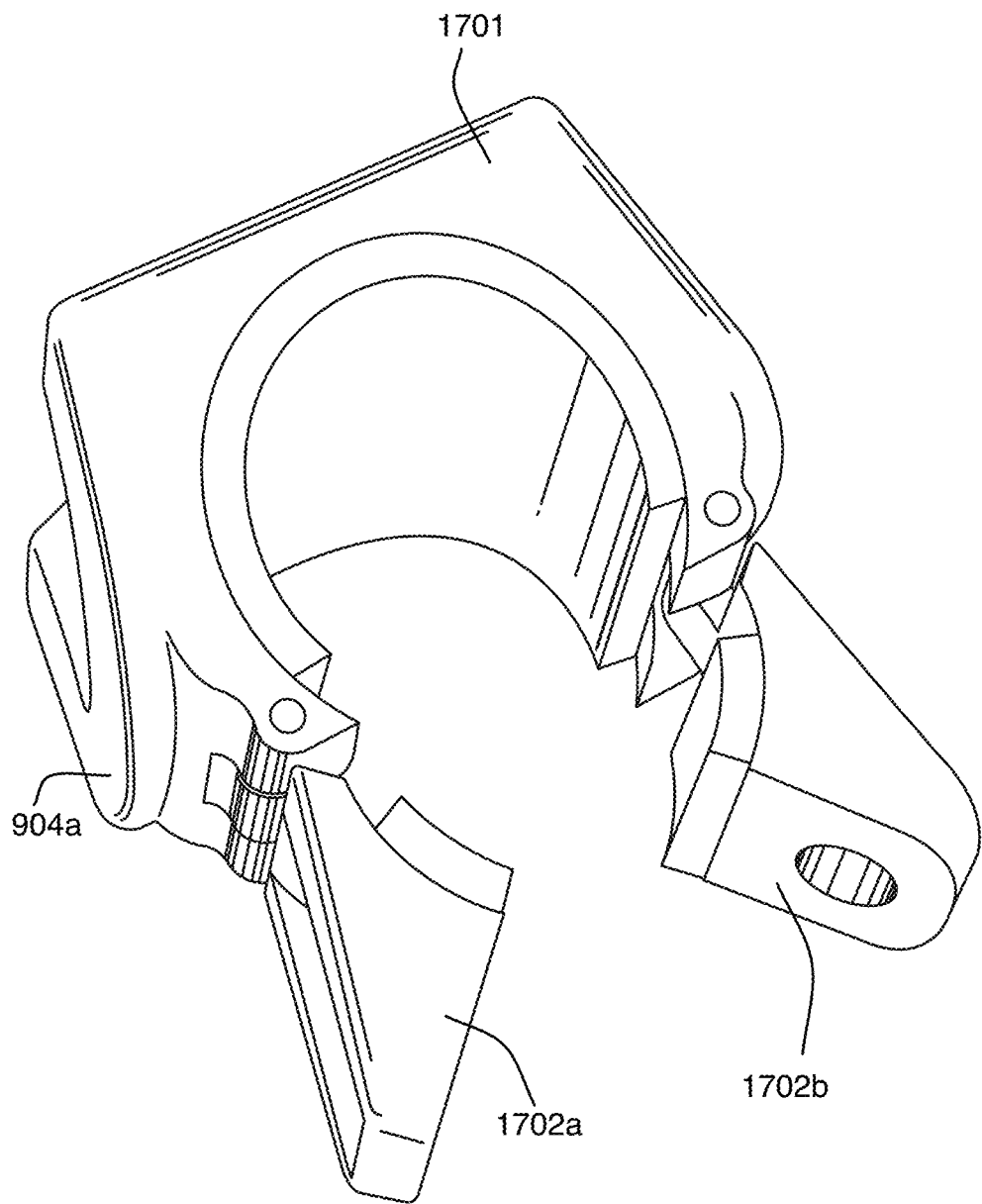
FIG. 22 shows a bottom perspective view of the second mount of FIG. 17, with the handlebar clasp open.

FIGS. 18 through 22 show different views of the second mount 1701 embodied as a bicycle mount. FIG. 18 shows a left side view, which shows a profile view of the two fourth mechanical coupling elements 904a on opposite sides of second mount 1701. In contrast to the Go-Pro® second mount 901, second mount 1701 has only two fourth mechanical coupling elements 904a to provide space for the handlebar to which second mount 1701 is attached. FIG. 19 shows a front view; FIG. 20 shows a top view; and FIG. 21 shows a bottom view. FIG. 22 shows a bottom perspective view of the second mount 1701, with the handlebar clamps 1702a and 1702b open.

Figure 23:
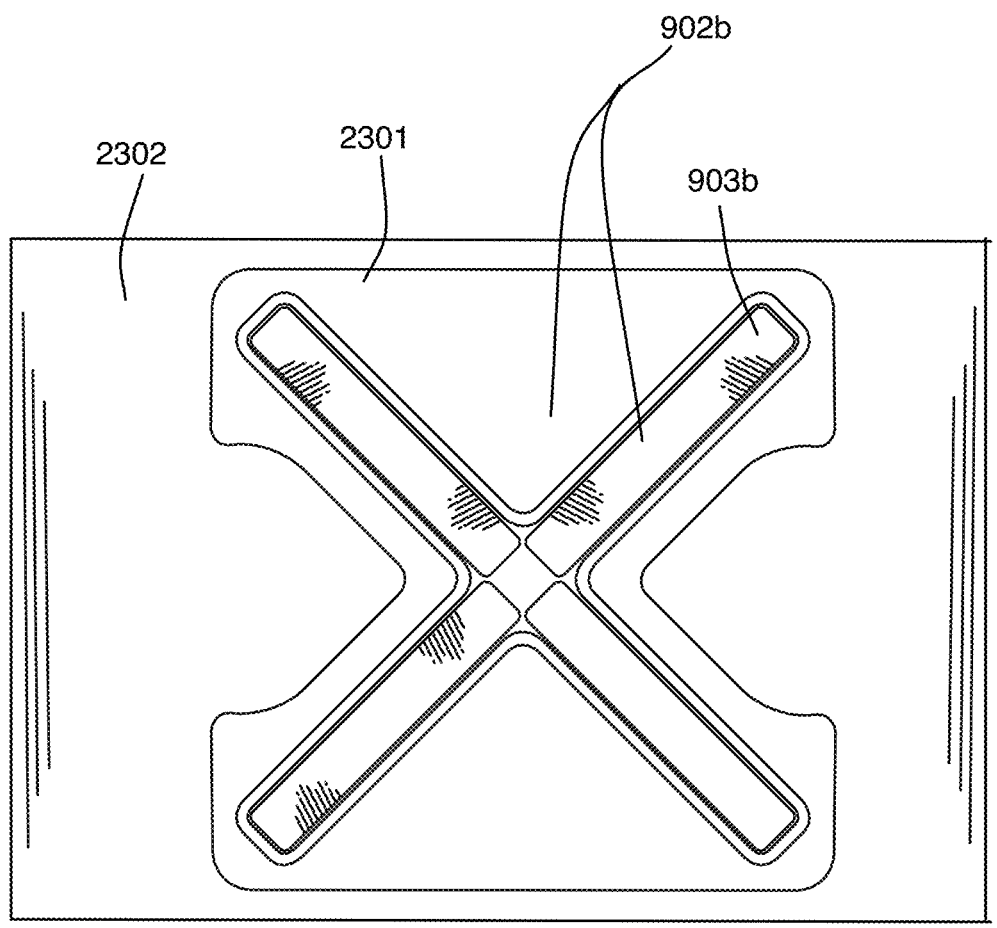
FIG. 23 shows an armband with an illustrative embodiment of the second mount.

In one or more embodiments, the first mount 101 may be coupled to a second mount 901 that attaches to or is integrated into an article worn by or carried by a person. FIG. 23 shows an illustrative embodiment with a second mount 2301 integrated into an armband 2302. Second mount 2301 has X-shaped second mechanical coupling element 903b, embodied as a protrusion, and second ferromagnetic coupling elements 902b, which couple to first mechanical coupling element 102, embodied as an indentation, and first ferromagnetic coupling elements 102, respectively. In this illustrative embodiment, no fourth mechanical coupling elements are provided to attach the third mechanical coupling elements 104, in order to provide a flat profile of the second mount 2301 against the armband 2302; however, the second ferromagnetic coupling element 902b and second mechanical coupling element 903b provide magnetic and mechanical coupling of the first mount 101 to the second mount 2301.

Figure 24:
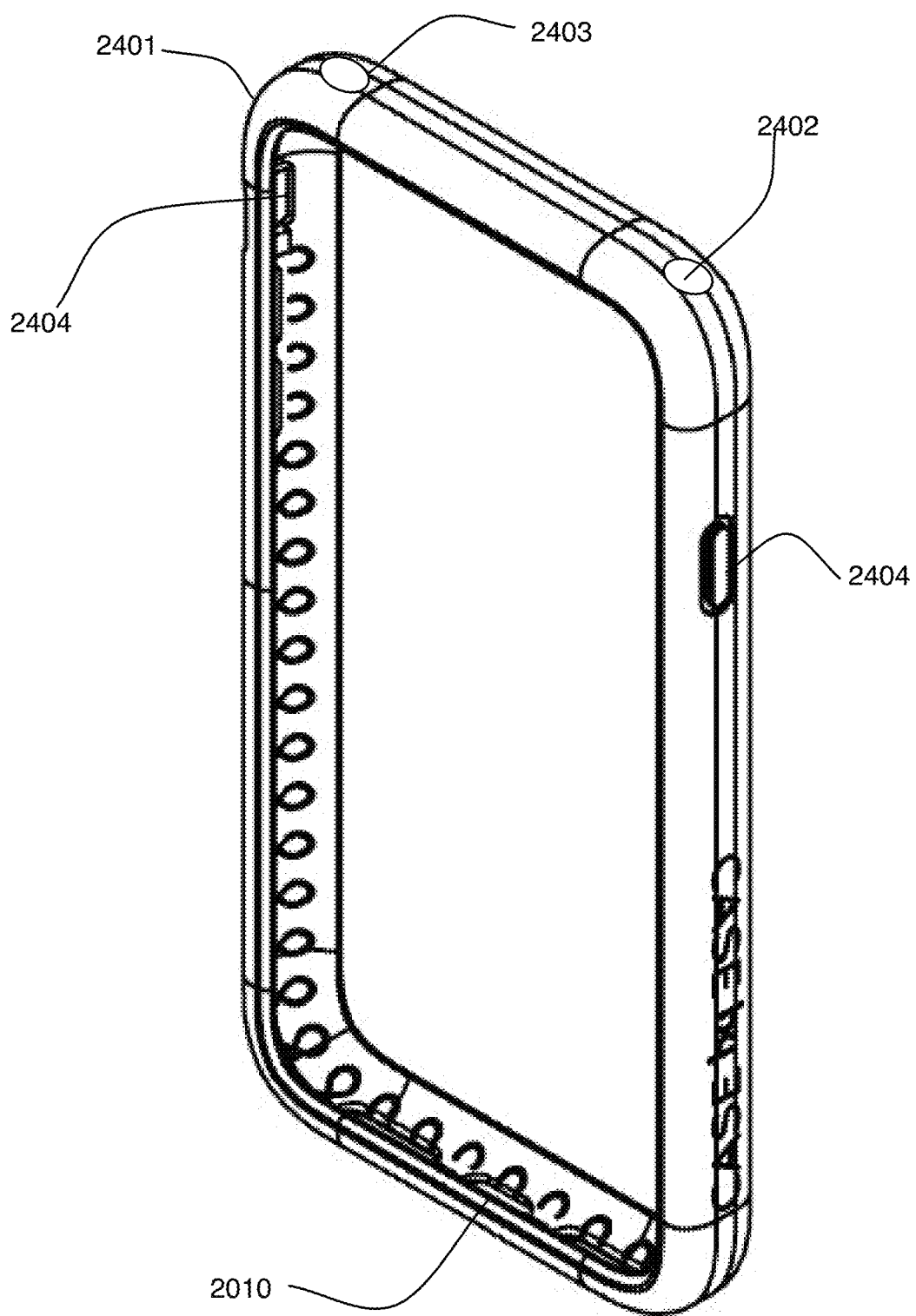
FIG. 24 shows an illustrative embodiment of a bumper that may for example be integrated into or attached to a first mount.

In one or more embodiments, a bumper or other shock absorbing or protective elements may be integrated into or attached to an object secured in first mount 101. FIG. 24 shows an illustrative embodiment of a bumper 2401 that may for example be integrated into or attached to a first mount 101. The bumper may be made for example of a force absorbing or shock absorbing material to protect the phone or other object installed into or attached to the first mount 101. The bumper may be configured to float, to prevent the first mount 101 from sinking when it is in water.

In one or more embodiments, bumper 2401 may contain one or more storage compartments, such as compartment 2402. This compartment may for example have a shape and size that provides a storage area for an object such as a pen, pencil, or stylus. It may be configured to hold any other object or objects, such as for example, without limitation, medicine, pills, keys, lipstick, nail clippers, a nail file, makeup, toothpicks, a knife, a screwdriver, a bottle opener, a corkscrew, a cigarette, an e-cigarette, a document, or a medical alert bracelet.

In one or more embodiments, bumper 2401 may include controls 2404 to control features of a device installed in or attached to first mount 101. For example, when first mount 101 is configured to hold a mobile phone, controls 2404 on bumper 2401 may include any or all of controls for volume, track, thumbs up, thumbs down, display brightness, power on, and power off. In one or more embodiments, bumper 2401 may include a light source 2403 or compartment 2402 for storing items, such as a stylus. Charging hole 2010 or speaker hole 2010 may also reside in any portion of the bumper.

Figure 25:
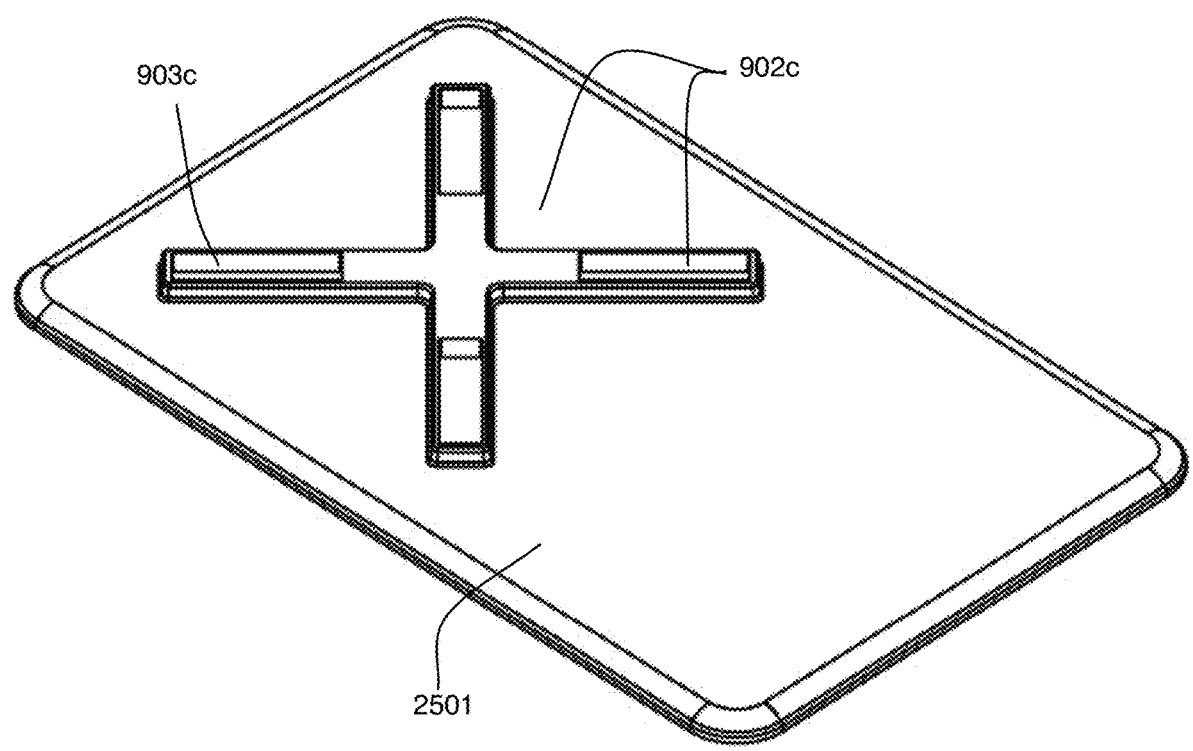
FIG. 25 shows an illustrative embodiment of an adhesive second mount that may be coupled to any other device to provide mounting capabilities.
Figure 26:
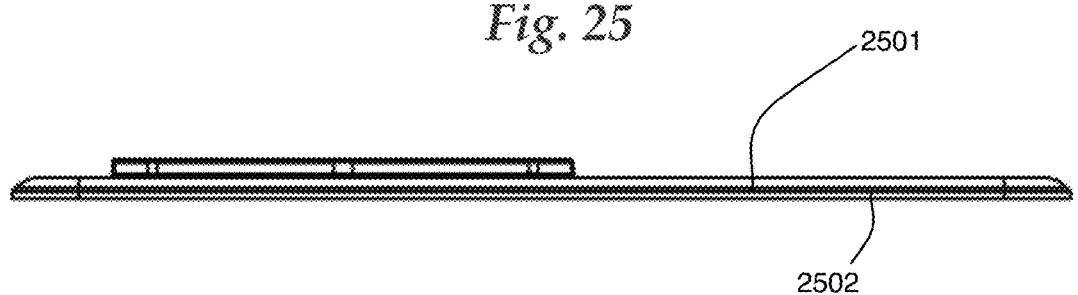
FIG. 26 shows a side view of the second mount embodiment of FIG. 25.

In one or more embodiments, a second mount 901 may be configured to attach to any surface of any object via for example an adhesive on the back face of the second mount 901. FIG. 25 shows an illustrative embodiment a second mount 2501 coupled with adhesive material 2502. Second mount 901 2501 has second mechanical coupling element 903c, and second ferromagnetic coupling elements 902c, which couple to first mechanical coupling element 102 and first ferromagnetic coupling elements 102, respectively. FIG. 26 shows a side view of second mount 2501; the back face 2502 may for example have an adhesive layer 2502 covered by a protective sheet that peels off. In one or more embodiments the back face 2502 may have other elements in addition to or instead of an adhesive that support attachment to other objects, such as for example, without limitation, suction cups, hooks, magnets, clamps, or studs. In one or more embodiments the second mount 2501 may have through holes that allow the receiver to be attached to an object using screws, bolts, or nails.

Figure 27:
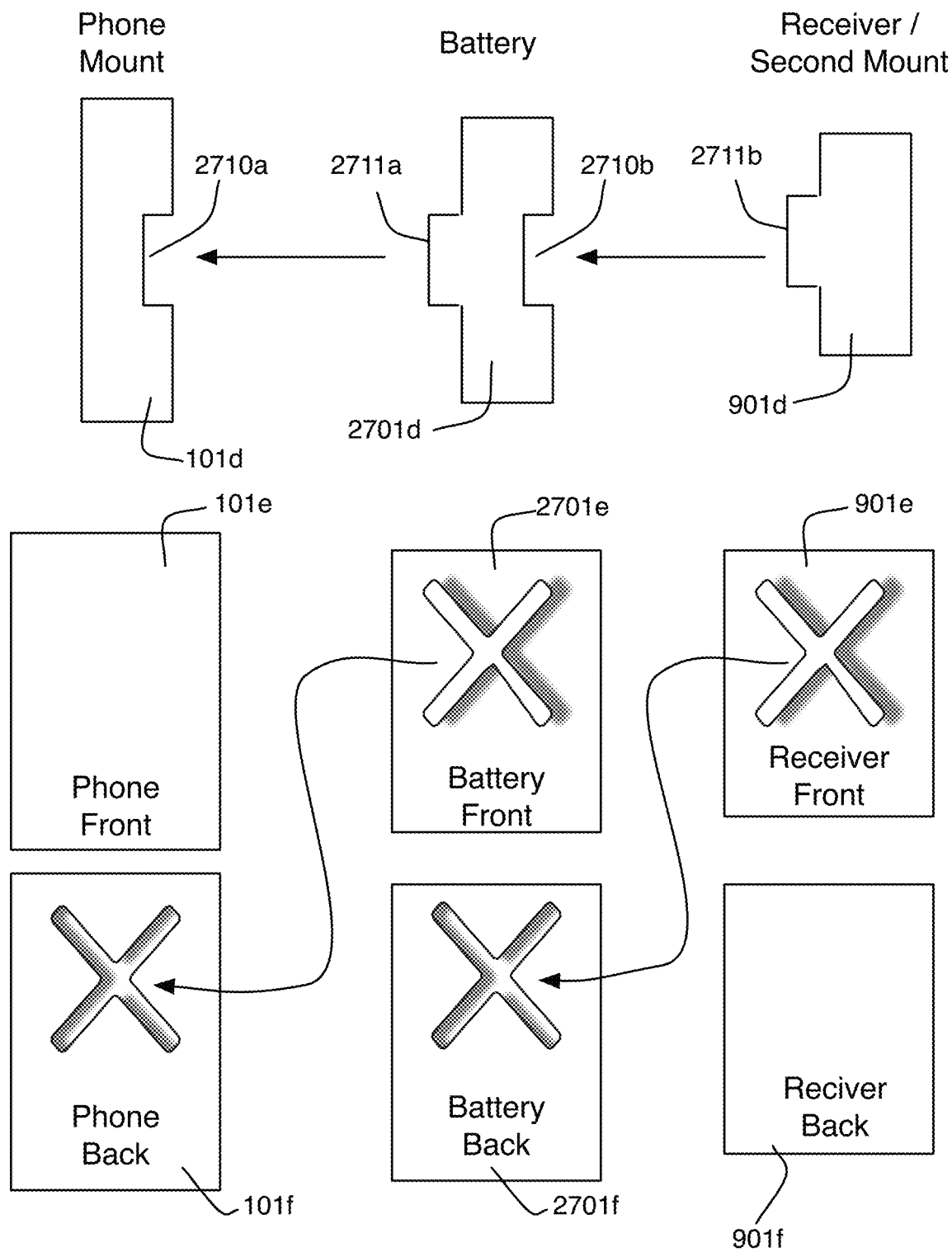
FIG. 27 illustrates a daisy-chain system that allows multiple mounts to be attached in series; in this example a first mount embodied as a phone case is coupled to an intermediate mount embodied as an external battery, which in turn is coupled to a second mount embodied as a bicycle mount or a Go-Pro® mount.

One or more embodiments may enable a modular connection system, which allows multiple mounts to be attached in series by daisy-chaining them together. FIG. 27 shows an illustrative embodiment with three mounts that may be daisy-chained together. This configuration is illustrative; in one or more embodiments any number of mounts may be attached together using a similar architecture. The three mounts that may be coupled in series in the embodiment of FIG. 27 are a phone mount 101d that secures a mobile phone, a battery mount 2701d that secures a battery, and a second mount 901d. The phone mount 101d may be for example a first mount 101 of FIG. 1, or a similar mount securing a phone or other object. The battery mount 2701d may be coupled to the phone mount 101d to provide inductive charging of the phone secured by the phone mount 101d, via coils similar to coils 930 and 931 described above. The second mount 910d may be attached to a bike, Go-Pro® or another object as described above.

Elements 101d, 2701d, and 901d are conceptual views of the profiles of a phone mount 101d, battery mount 2701d, and second mount 901d, respectively. These views illustrate the modular architecture that supports daisy-chaining: a top element of the stack of components has an indentation or other feature 2710a similar to the first mechanical coupling element 102 that couples to a corresponding protrusion or other corresponding feature 2711a similar to the second mechanical coupling element 901 on the next element in the stack. Any intermediate mount, such as the battery mount 2701d in FIG. 27, has both a protrusion 2711a similar to the second mechanical coupling element 901 to couple to an adjacent element, and an indentation 2710b similar to the first mechanical coupling element 102 to couple to an adjacent element. In addition to or instead of protrusions and corresponding indentations, coupling may be performed by compatible magnetic elements, or by other mating mechanical components. The bottom element in a stack, such as second mount 901d, has a protrusion 2711b similar to the second mechanical coupling element 901 to couple to the adjacent element (which is the battery mount 2701d in FIG. 27). It is apparent that this architecture may be extended to any number of components of any type, as long as all elements in a stack have compatible features to couple to the elements above and below them in the stack.

FIG. 27 shows front and back views of the phone mount 101d, battery mount 2701d, and second mount 901d, focusing here only on the X-shaped protrusions and indentations to simplify the exposition. Other features such as magnetic coupling elements may also be present on the front or back faces of these components. Front face 101e of the phone mount 101d is the top of the stack; therefore, it does not need any coupling elements. Back face 101f of the phone mount 101d has an X-shaped indentation, which couples to an X-shaped protrusion on the front face 2701e of battery mount 2701d. Back face 2701f of the battery mount 2701d has an X-shaped indentation that couples to a corresponding X-shaped protrusion on the front face 901e of the second mount 901d. The back face 901f of the second mount 901d is the bottom of the stack, so it does not require coupling features to the other components; however, it may have features that couple to other objects, such as the bicycle handlebar and Go-Pro® couplings illustrated above.

While the invention herein disclosed has been described by means of specific embodiments and applications thereof, numerous modifications and variations could be made thereto by those skilled in the art without departing from the scope of the invention set forth in the claims.

What is claimed is:

1. A rotationally limited connection system comprising:
   a first mount configured to hold a first object or couple with said first object;
   a first ferromagnetic coupling element comprising a material attracted to a magnet or wherein said material comprises a first magnet;
   a first mechanical coupling element configured to limit rotation of said first mount with respect to a second object in 90 degree increments;
   wherein said first ferromagnetic coupling element and said first mechanical coupling element are integrated with said first mount;
   a second mount configured to hold said second object or couple with said second object;

a second ferromagnetic coupling element comprising a material attracted to said first magnet or wherein said material comprises a second magnet;
a second mechanical coupling element configured to mate with said first mechanical coupling element to limit rotation of said first mount with respect to said second object in said 90 degree increments;
wherein said second ferromagnetic coupling element and said second mechanical coupling element are integrated with said second mount;
at least one third mechanical coupling element integrated with said first mount, the at least one third mechanical coupling element configured to rotate toward and away from said first mount wherein said at least one third mechanical coupling element is further configured to rotate substantially 90 degrees away from said first mount and extend a distal portion of the third mechanical coupling element away from the first mount to couple with a fourth mechanical coupling element integrated with said second mount.

2. A rotationally limited connection system comprising:
a first mount configured to hold a first object or couple with said first object;
a first ferromagnetic coupling element comprising a material attracted to a magnet or wherein said material comprises a first magnet;
a first mechanical coupling element configured to limit rotation of said first mount with respect to a second object in 90 degree increments;
wherein said first ferromagnetic coupling element and said first mechanical coupling element are integrated with said first mount;
a second mount configured to hold said second object or couple with said second object;
a second ferromagnetic coupling element comprising a material attracted to said first magnet or wherein said material comprises a second magnet;
a second mechanical coupling element configured to limit rotation of said first mount with respect to said second mount in said 90 degree increments;
wherein said second ferromagnetic coupling element and said second mechanical coupling element are integrated with said second mount;
at least one third mechanical coupling element integrated with said first mount, the at least one third mechanical coupling element comprising an arc having two pivotable connections to the first mount, the at least one third mechanical coupling element configured to rotate about the two pivotable connections toward and away from said first mount and configured with two narrow portions proximal to said first mount and a wide portion distal to said first mount in the rotated away position, wherein said at least one third mechanical coupling element is further configured to rotate about the two pivotable connections away from said first mount and extend the distal portion away from the first mount to couple with a fourth mechanical coupling element at said distal portion and wherein said fourth mechanical coupling element is integrated with said second mount.

3. A rotationally limited connection system comprising:
a first mount configured to hold a first object or couple with said first object;
a first ferromagnetic coupling element comprising a material attracted to a magnet or wherein said material comprises a first magnet; and
a first mechanical coupling element comprising at least one indentation configured to permit coupling and decoupling of said first mount with respect to a second object in increments, wherein said first ferromagnetic coupling element and said first mechanical coupling element are integrated with said first mount;
a second mount configured to hold said second object or couple with said second object;
a second ferromagnetic coupling element comprising a material attracted to said first magnet or wherein said material comprises a second magnet;
a second mechanical coupling element comprising at least one protrusion configured to permit coupling and decoupling of said first mount with respect to said second mount in said increments;
wherein said second ferromagnetic coupling element and said second mechanical coupling element are integrated with said second mount; and
at least one third mechanical coupling element integrated with said first mount, the at least one third mechanical coupling element comprising an arc having two pivotable connections to the first mount, the at least one third mechanical coupling element configured to rotate about the two pivotable connections toward and away from said first mount, wherein said at least one third mechanical coupling element is further configured to rotate about the two pivotable connections away from said first mount and couple with a fourth mechanical coupling element integrated with said second mount.

4. The connection system of claim 3, wherein the-at least one third mechanical coupling element comprises a narrow portion proximal to said first mount and a wide portion distal to said first mount, wherein said at least one third mechanical coupling element is further configured to couple with the fourth mechanical coupling element at said distal portion.

5. The connection system of claim 3 wherein said first mount comprises a first coil configured to inductively receive electrical power, and wherein said second mount or said second object coupled with said second mount comprises a second coil configured to inductively supply electrical power.

6. A rotationally limited connection system comprising:
a first mount configured to hold a first object or couple with said first object;
a first ferromagnetic coupling element comprising a material attracted to a magnet or wherein said material comprises a first magnet;
a first mechanical coupling element comprising at least one indentation configured to permit coupling and decoupling of said first mount with respect to a second object in increments, wherein said first ferromagnetic coupling element and said first mechanical coupling element are integrated with said first mount, and wherein said first mechanical coupling element comprises a portion of said first ferromagnetic coupling element, or wherein said first ferromagnetic coupling element is proximal said first mechanical coupling element;
a second mount configured to hold said second object or couple with said second object;
a second ferromagnetic coupling element comprising a material attracted to said first magnet or wherein said material comprises a second magnet;
a second mechanical coupling element comprising at least one protrusion configured to permit coupling and decoupling of said first mount with respect to said second mount in said increments;

wherein said second ferromagnetic coupling element and said second mechanical coupling element are integrated with said second mount; and at least one third mechanical coupling element integrated with said first mount, the at least one third mechanical coupling element configured to rotate toward and away from said first mount, wherein said at least one third mechanical coupling element is further configured to rotate substantially 90 degrees away from said first mount and extend a distal portion of the third mechanical coupling element away from the first mount to couple with a fourth mechanical coupling element integrated with said second mount.

7. The connection system of claim 3 wherein said first object comprises a first coil configured to inductively receive electrical power, and wherein said second mount or said second object coupled with said second mount comprises a second coil configured to inductively supply electrical power.

\* \* \* \* \*